(12) United States Patent
Tohyama

(10) Patent No.: US 6,831,420 B1
(45) Date of Patent: Dec. 14, 2004

(54) LIGHT EMITTING SYSTEM, TRANSMITTING APPARATUS FOR USE IN LIGHT EMITTING SYSTEM, AND RECEIVING APPARATUS FOR USE IN LIGHT EMITTING SYSTEM

(75) Inventor: Kei Tohyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 10/338,580

(22) Filed: Jan. 8, 2003

(30) Foreign Application Priority Data

Jan. 11, 2002 (JP) ............................. 2002-004200

(51) Int. Cl.$^7$ ............................................. H05B 37/02
(52) U.S. Cl. ........................................ 315/149; 315/295
(58) Field of Search ................................. 315/149–159, 315/291–295

(56) References Cited

U.S. PATENT DOCUMENTS 5,838,116 A * 11/1998 Katyl et al. ............... 315/291
6,667,578 B2 * 12/2003 Lansing et al. ........... 315/295
6,717,660 B1 * 4/2004 Bernardo ................... 315/149

* cited by examiner

*Primary Examiner*—Wilson Lee
(74) *Attorney, Agent, or Firm*—Cowan, Liebowitz & Latman

(57) ABSTRACT

The invention relates to a light emitting system and transmitting apparatus and receiving apparatus to be used in the light emitting system. The transmitting apparatus has a first transmitting circuit that transmits a light emission data signal for setting a light emission condition by a signal other than light on a wireless basis and a second transmitting circuit that transmits a light emission start signal for starting light emission by light on a wireless basis. The receiving apparatus is either adapted to be connected to an illuminating apparatus that emits illuminating light or having such an illuminating apparatus. The receiving apparatus has a first receiving circuit that receives the light emission data signal by the signal other than light on a wireless basis, a second receiving circuit that receives the light emission start signal by light on a wireless basis, and a control circuit that performs a light emission preparation operation of the illuminating apparatus based on an output of the first receiving circuit that has received said light emission data signal and causes the illuminating apparatus to emit light based on an output of the second receiving circuit that has received the light emission start signal.

18 Claims, 21 Drawing Sheets

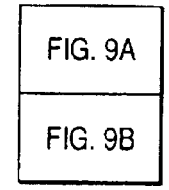
FIG. 9A
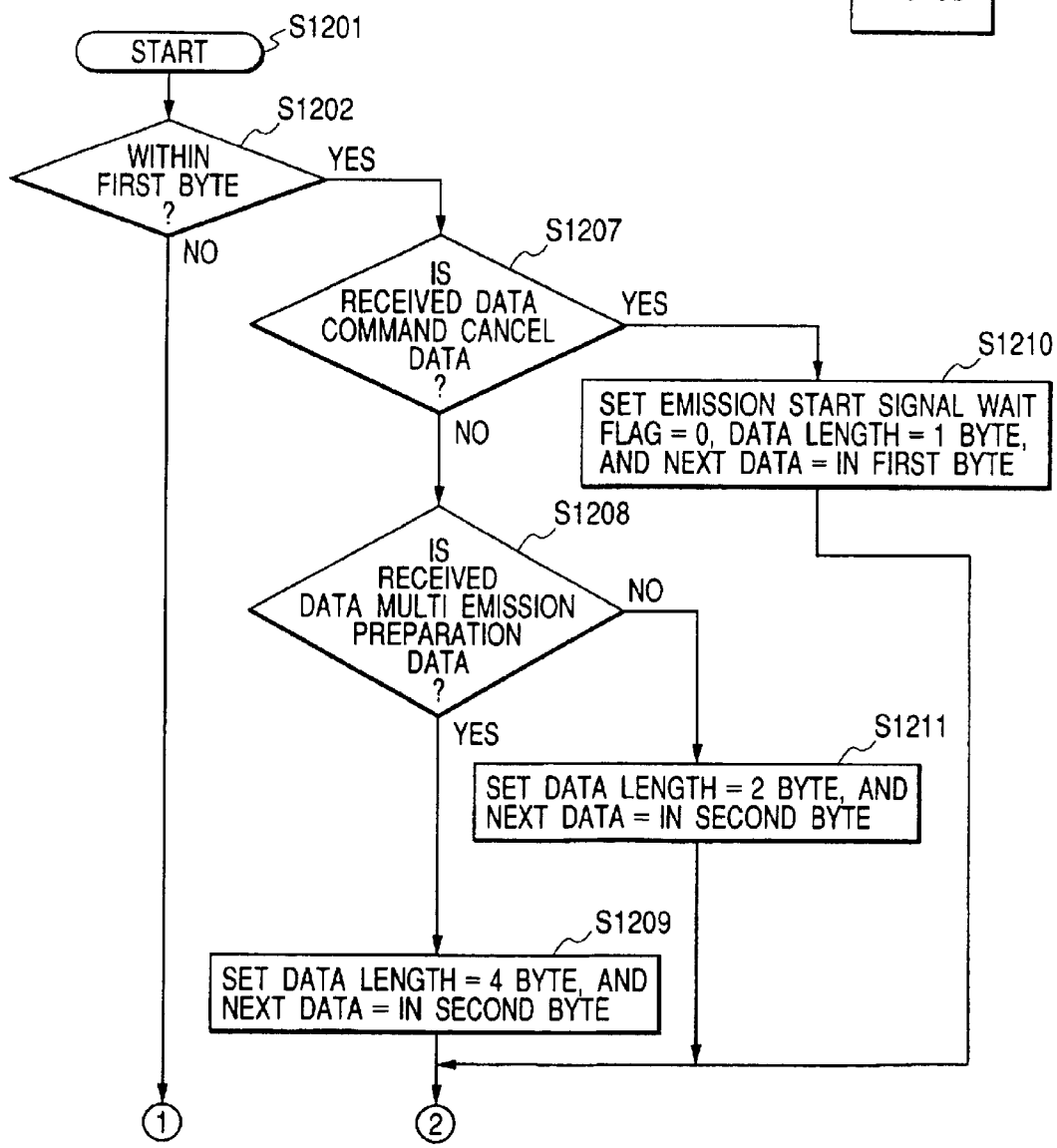

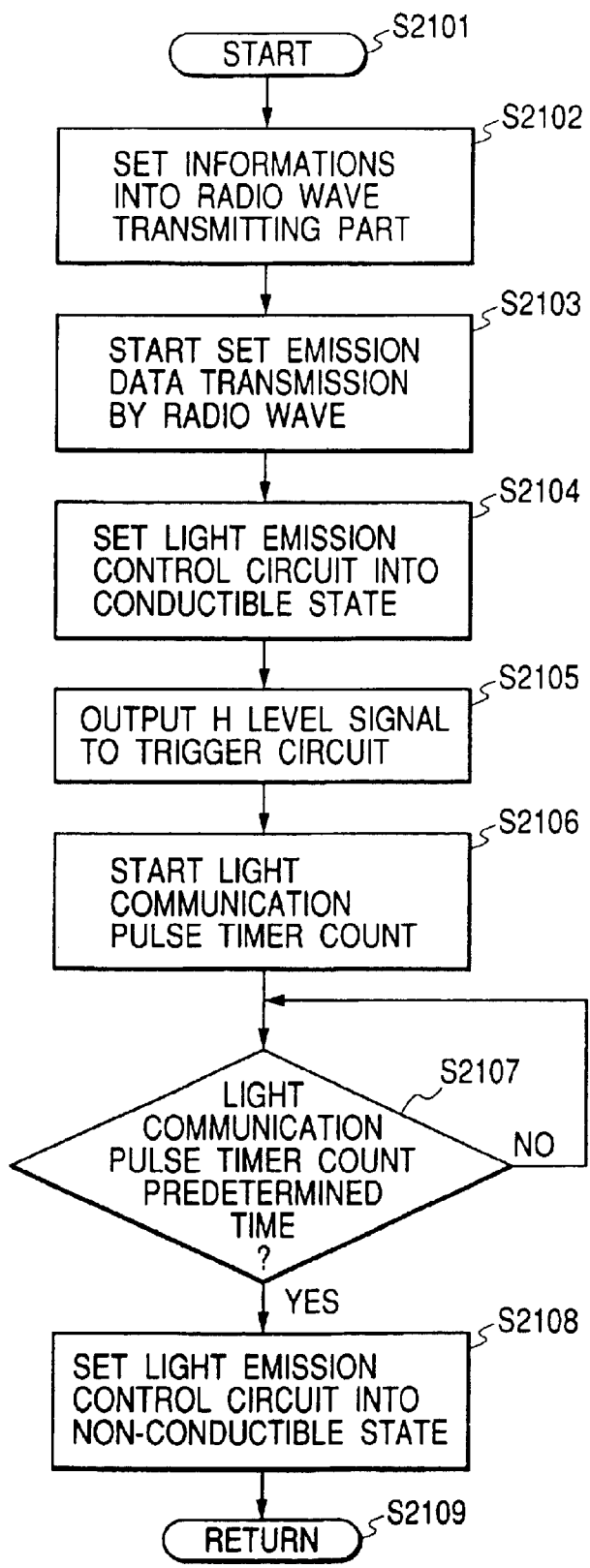

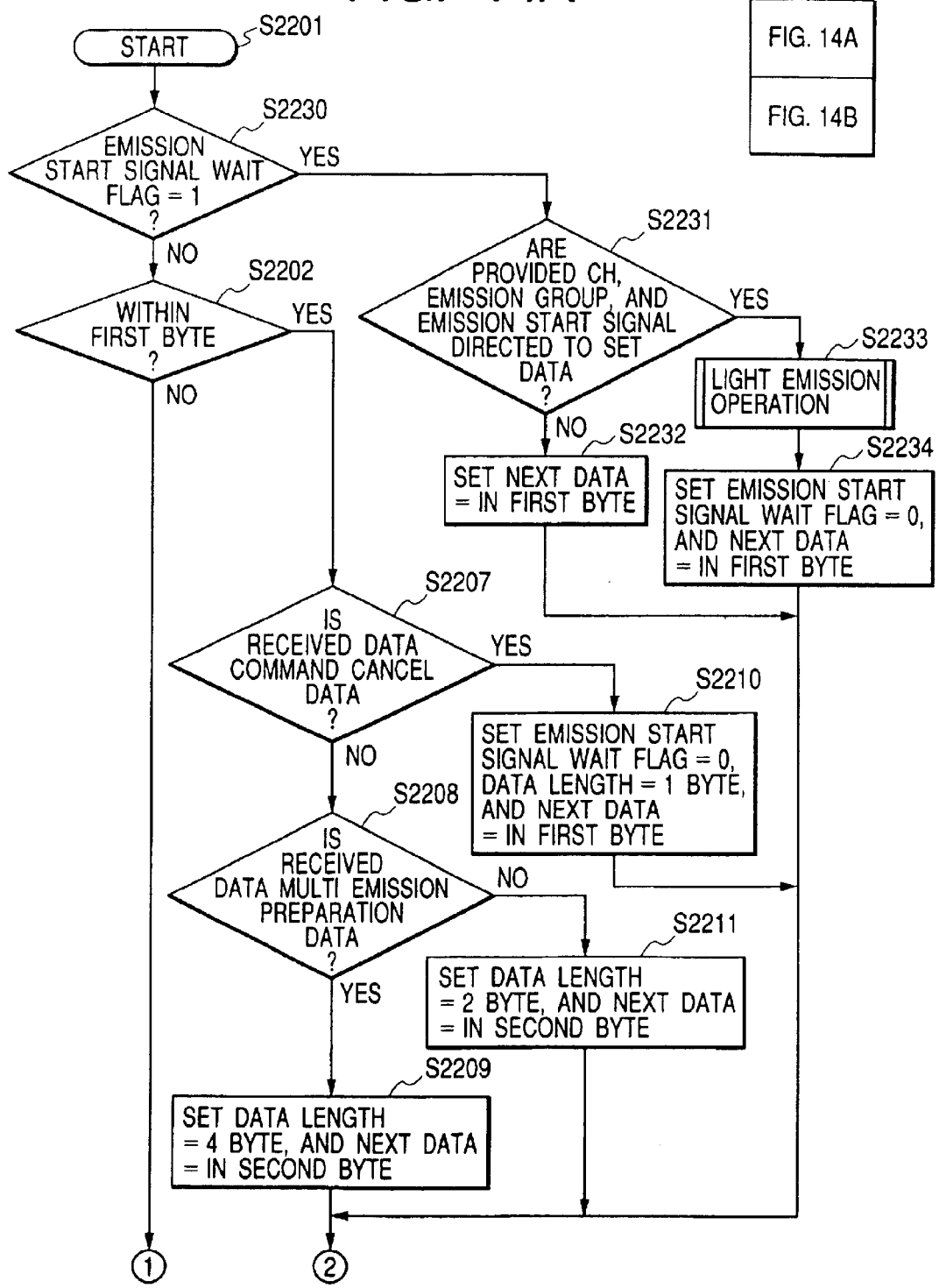

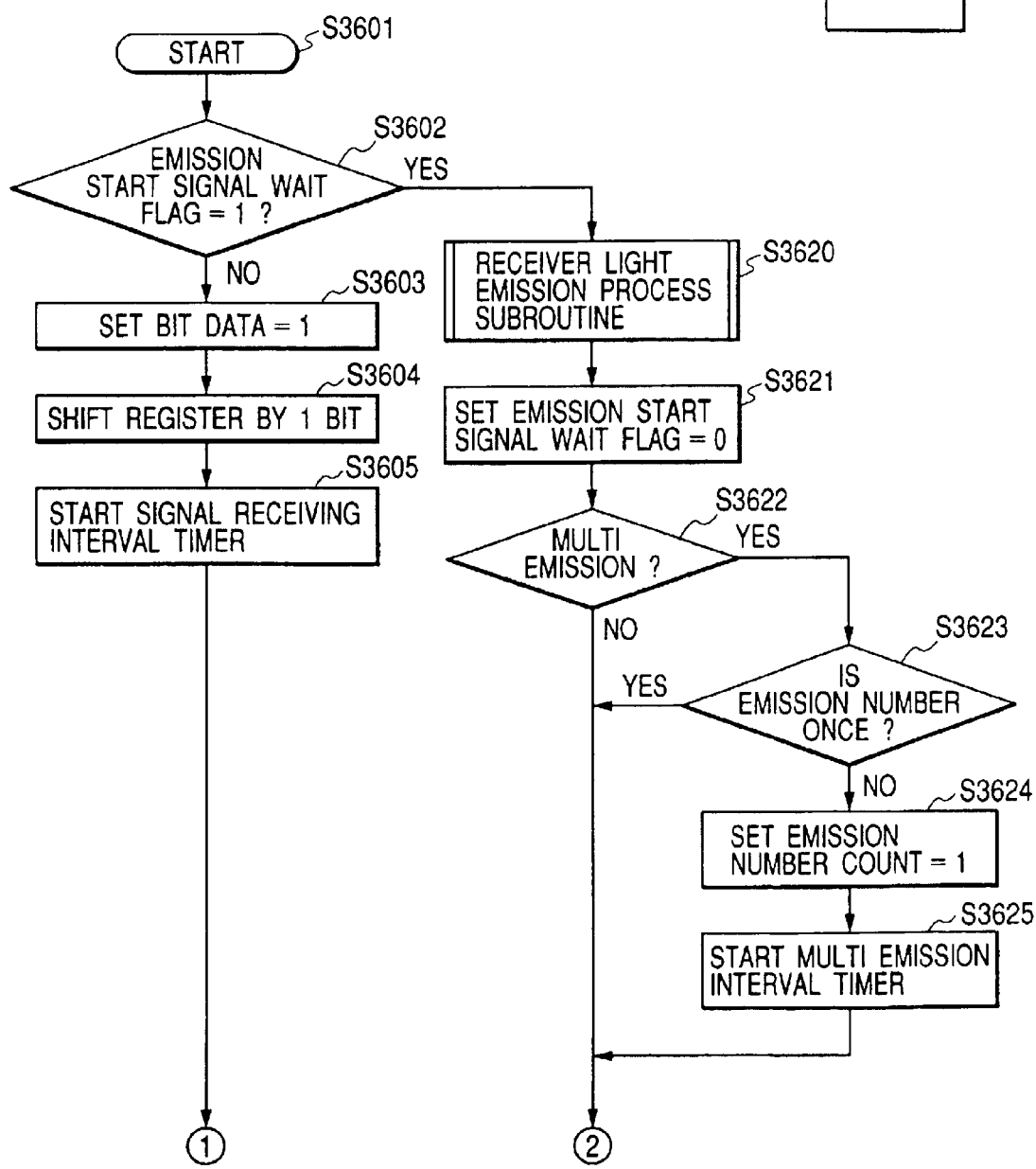

LIGHT EMITTING SYSTEM, TRANSMITTING APPARATUS FOR USE IN LIGHT EMITTING SYSTEM, AND RECEIVING APPARATUS FOR USE IN LIGHT EMITTING SYSTEM

BACKGROUND OF THE INVENTION

1. Field of the Invention

The present invention relates to a light emitting system that can be controlled on a wireless basis.

2. Related Background Art

Japanese Patent Application Laid-Open No. 54-115224 proposes a wireless flash photography system that performs a signal communication only by radio wave. The wireless flash photography system disclosed in Japanese Patent Application Laid-Open No. 54-115224 transmits a carrier wave signal in advance before shutter release of a camera and increases the energy of the carrier wave signal at the time of releasing the-shutter in order to shorten the time up until the light emission.

However, the wireless flash photography system disclosed in the above-mentioned Japanese Patent Application Laid-Open No. 54-115224 consumes a large amount of electric power, since it transmits the carrier wave signal continuously before the shutter release.

In view of this, the above-mentioned system is susceptible to improvement to enable quick light emission at the time of the release of a camera shutter without continuously emitting a carrier wave signal.

SUMMARY OF THE INVENTION

According to one aspect of the invention there is provided a light emitting system that performs wireless communication by a signal other than light and wireless communication by light, and a transmitting apparatus and a receiving apparatus that constitute such a light emitting system. The transmitting apparatus transmits a light emission data signal for setting a light emitting condition(s) of an illuminating apparatus to the receiving apparatus by a signal other than light on a wireless basis, and transmits a light emission start signal for starting light emission by light on a wireless basis. The receiving apparatus causes the illuminating apparatus to perform a light emission preparation operation based on the light emission data signal, and causes the illuminating apparatus to emit light based on the light emission start signal. With the invention, it is possible to suppress consumption of electric power required for transmission and to shorten the delay time between inputting of a light emission command to the transmitter and light emission of the receiver.

According to anther aspect of the invention, there is provided a light emitting system that performs wireless communication by a signal other than light and wireless communication by light, and a transmitting apparatus and a receiving apparatus that constitute such a light emitting system. The transmitting apparatus transmits a light emission data signal for setting a light emitting condition(s) of an illuminating apparatus to the receiving apparatus by a signal other than light and by light, on a wireless basis, and transmits a light emission start signal for starting light emission by light on a wireless basis. A first receiving apparatus causes a first illuminating apparatus to perform a light emission preparation operation based on the light emission data signal that has been transmitted by light, and causes the first illuminating apparatus to emit light based on the light emission start signal. A second receiving apparatus causes a second illuminating apparatus to perform a light emission preparation operation based on the light emission data signal that has been transmitted by the signal other than light, and causes the second illuminating apparatus to emit light based on the light emission start signal. Since the light emission data signal is communicated by light and a signal other than light on a wireless basis and the light emission start signal is transmitted by light on a wireless basis, it is possible to cause illuminating apparatus to emit light appropriately, even if a receiver that receives the light emission data by the signal other than light and receives the light emission start signal by light and a receiver that receives the light emission data as well as the light emission start signal by light are used in combination.

BRIEF DESCRIPTION OF THE DRAWINGS

FIG. 13 is a flow chart showing an operation of the transmitter in the second embodiment of the present invention.

DESCRIPTION OF THE PREFERRED EMBODIMENTS

Figure 1A:
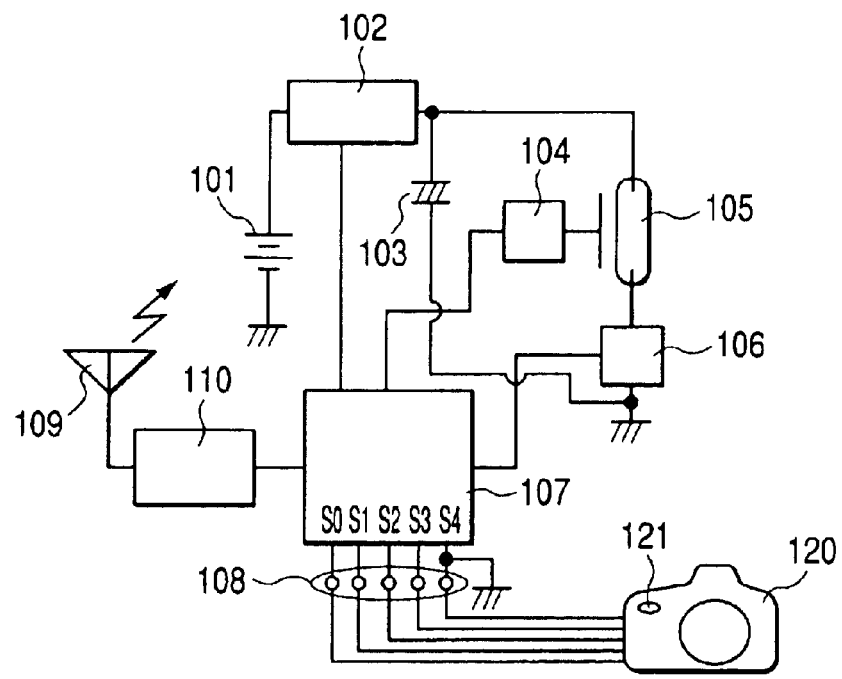
FIGS. 1A and 1B are block diagrams showing the structures of a transmitter and a receiver in the first embodiment of the present invention respectively.
Figure 1B:
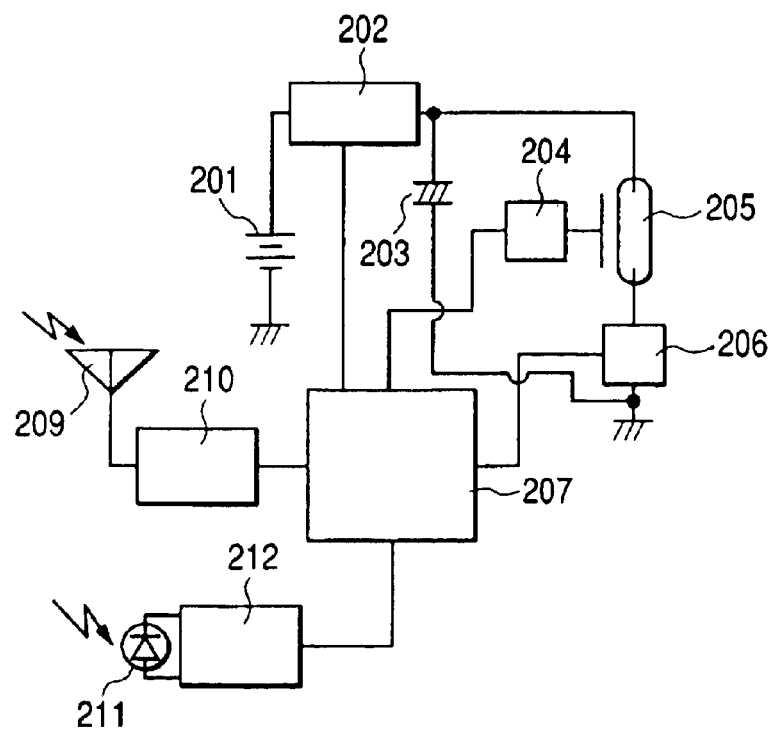

FIGS. 1A and 1B are drawings showing a light emitting system as an embodiment of the invention best. FIG. 1A is a block diagram showing the composition of the circuit of a flash apparatus that functions as a transmitter (master), while FIG. 1B is a block diagram showing the composition of the circuit of a flash apparatus that functions as a receiver (slave). The flash apparatus that functions as the transmitter is capable of communicating with a body 120 of a camera.

In FIG. 1A, reference numeral 101 designates a battery serving as a power source, reference numeral 102 designates a boosting circuit for raising the voltage of the battery 101 by several hundreds volts, and reference numeral 103 designates a main condenser for storing the electric energy boosted by the boosting circuit 102.

Reference numeral 104 designates a trigger circuit that applies a voltage as high as several kilovolts to a discharge tube 105 to cause it to emit light. The discharge tube 105 emits light by converting the electric energy stored in the main condenser 103 into light energy. Reference numeral 106 designates a light emission control circuit, which is switched between a conductible state (or on-state) and a non-conductible state (or off-state) to control the light emission (or flashing) of the discharge tube 105.

Reference numeral 107 designates a microcomputer that controls operations of the flash apparatus functioning as the transmitter. (This microcomputer will be referred to as a microcomputer of the transmitter, hereinafter.) Reference numeral 110 designates a radio wave transmitting part that converts a digital signal output from the microcomputer 107 of the transmitter into a radio wave wireless signal. Reference numeral 109 designates an antenna, which transmits a radio wave corresponding to the output of the radio wave transmitting part 110.

Reference numeral 108 designates terminals for allowing signal communications between the camera body 120 and the microcomputer 107 of the transmitter. Among these terminals 108, terminal S0 is provided for a clock signal sent from the camera body 120, terminal S1 is provided for transmission of prescribed data from the camera body 120 to the microcomputer 107 of the transmitter in synchronization with a clock transmitted through the terminal S0.

Terminal S2 is provided for transmission of prescribed data from the microcomputer 107 of the transmitter to the camera body 120 in synchronization with a clock transmitted through the terminal S0. Terminal S3 is provided for transmission of a signal commanding the start of the light emission, from the camera body 120 to the microcomputer 107 of the transmitter. Terminal S4 is a GND (ground) terminal.

In the flash apparatus functioning as the transmitter as described above, when a power switch (not shown) provided on this flash apparatus is turned on, the microcomputer 107 of the transmitter starts its operation and causes the boosting circuit 102 to start to operate. Electric energy boosted by the boosting circuit 102 is stored in the condenser 103. The charging of the condenser 103 with the electric energy is continued until a voltage that enables the light emission of the discharge tube 105 is attained.

In the following, the structure of the flash apparatus functioning as the receiver will be described. In FIG. 1B, reference numeral 201 designates a battery serving as a power source, reference numeral 202 designates a boosting circuit for raising the voltage of the battery 201 by several hundreds volts, and reference numeral 203 designates a main condenser for storing the electric energy boosted by the boosting circuit 202.

Reference numeral 204 designates a trigger circuit that applies a voltage as high as several kilovolts to a discharge tube 205 to cause it to emit light. The discharge tube 205 emits light by converting the electric energy stored in the main condenser 203 into light energy. Reference numeral 206 designates a light emission control circuit, which is switched between a conductible state and non-conductible state to control the light emission of the discharge tube 205.

Reference numeral 207 designates a microcomputer that controls operations of the flash apparatus functioning as the receiver. (This microcomputer will be referred to as a microcomputer of the receiver, hereinafter.) Reference numeral 210 designates an antenna for receiving the radio wave transmitted from the transmitter (i.e. from the antenna 109). Reference numeral 210 designates a radio wave receiving part that converts radio wave received through the antenna 209 into a digital signal. The digital signal obtained by that conversion is output to the microcomputer 207 of the receiver.

Reference numeral 211 designates a light receiving sensor for receiving light (that is, light emission start signal) emitted from the discharge tube 105 of the flash apparatus functioning as the transmitter. Reference numeral 212 designates an existing light receiving part for converting a light signal received by the light receiving sensor 211 to an electric signal. The electric signal obtained by that conversion in the light receiving part 212 is output to the microcomputer 207 of the receiver.

In the flash apparatus functioning as the receiver as described above, when a power switch (not shown) provided on this flash apparatus is turned on, the microcomputer 207 of the receiver starts its operation and causes the boosting circuit 202 to start to operate. Electric energy boosted by the boosting circuit 202 is stored in the condenser 203. The charging of the condenser 203 with the electric energy is continued until a voltage that enables the light emission of the discharge tube 205 is attained. In connection with the above-described apparatus, while the receiver according to this embodiment is composed as a unit including a light emitting part (including the discharge tube 205 or the like) and a receiving part (including the antenna 209, the radio wave receiving part 210, the light receiving sensor 211, and the light receiving part 212), the light emitting part and the receiving part may be constructed as separate units that are adapted to be connected to each other.

In the following, a description will be made of an operation of the transmitter on the occasion of photographing (wireless photographing) with the light emission from the receiver.

Firstly, a description will be made, with reference to the flow chart shown in FIG. 7, of a communicating operation between the camera body 120 and the microcomputer 107 of the transmitter and an operation of the transmitter in response to that communicating operation.

When a clock signal of one byte length is input to the terminal S0 of the microcomputer 107 of the transmitter (at time T0 in FIG. 3), an interrupt for communication occurs in the microcomputer 107 of the transmitter (step S1001). In step S1002, the microcomputer of the transmitter determines whether or not the command transmitted from the camera body 120 is a command for transmitting a light emission preparation signal (which will be hereinafter referred to as a light emission preparation signal transmission command). When it is determined that the transmitted command is the light emission preparation signal transmission command, the process proceeds to step S1005, while when it is determined that the command is not the light emission preparation signal transmission command, the process proceeds to step S1003.

In step S1003, communication processes other than the communication process for light emission preparation signal transmission command are performed, and the process proceeds to step S1004. In step S1005, information (i.e. light emission data) on the channel. (CH) of the wireless communication, light emission groups, one shot emission, and multi shot emission set in the transmitter or in the camera body 120 is set in the radio wave transmitting part 110 in accordance with the format indicated in the following Table 1 through Table 4.

TABLE 3

| Number of Emission | D7 | D6 | D5 | D4 | D3 | D2 | D1 | D0 |
|---|---|---|---|---|---|---|---|---|
| — | 1 | 0 | 0 | 0 | 0 | 0 | 0 | 0 |
| Once | 1 | 0 | 0 | 0 | 0 | 0 | 0 | 1 |
| Twice | 1 | 0 | 0 | 0 | 0 | 0 | 1 | 0 |
| Three times | 1 | 0 | 0 | 0 | 0 | 0 | 1 | 1 |
| Four times | 1 | 0 | 0 | 0 | 0 | 1 | 0 | 0 |
| Five times | 1 | 0 | 0 | 0 | 0 | 1 | 0 | 1 |
| . | . | . | . | . | . | . | . | . |
| . | . | . | . | . | . | . | . | . |
| Fifty-five times | 1 | 1 | 1 | 1 | 0 | 1 | 1 | 1 |
| Fifty-six times | 1 | 1 | 1 | 1 | 1 | 0 | 0 | 0 |
| Fifty-seven times | 1 | 1 | 1 | 1 | 1 | 0 | 0 | 1 |
| Fifty-eight times | 1 | 1 | 1 | 1 | 1 | 0 | 1 | 0 |
| Fifty-nine times | 1 | 1 | 1 | 1 | 1 | 0 | 1 | 1 |
| Sixty times | 1 | 1 | 1 | 1 | 1 | 1 | 0 | 0 |
| Sixty-one times | 1 | 1 | 1 | 1 | 1 | 1 | 0 | 1 |
| Sixty-two times | 1 | 1 | 1 | 1 | 1 | 1 | 1 | 0 |
| Sixty-three times | 1 | 1 | 1 | 1 | 1 | 1 | 1 | 1 |

TABLE 1

| Command Name | First byte | | | | | | | | Second byte | Third byte | Fourth byte |
|---|---|---|---|---|---|---|---|---|---|---|---|
| | D7 | D6 | D5 | D4 | D3 | D2 | D1 | D0 | | | |
| CH1 | 1 | 0 | 0 | — | — | — | — | — | | | |
| CH2 | 1 | 0 | 1 | — | — | — | — | — | | | |
| CH3 | 1 | 1 | 0 | — | — | — | — | — | | | |
| CH4 | 1 | 1 | 1 | — | — | — | — | — | | | |
| Group A | — | — | — | 0 | 0 | — | — | — | | | |
| Group B | — | — | — | 0 | 1 | — | — | — | | | |
| Group C | — | — | — | 1 | 0 | — | — | — | | | |
| Whole group | — | — | — | 1 | 1 | — | — | — | | | |
| One shot emission preparation | — | — | — | — | — | 1 | 0 | 0 | Emission amount | | |
| Multi shot emission preparation | — | — | — | — | — | 1 | 1 | 0 | Emission amount | Emission number | Emission frequency |
| Command cancel | — | — | — | — | — | 0 | 0 | 0 | | | |

TABLE 2

| Emission Amount | D7 | D6 | D5 | D4 | D3 | D2 | D1 | D0 |
|---|---|---|---|---|---|---|---|---|
| Full emission | 1 | 0 | 0 | 0 | 0 | 0 | 0 | 0 |
| Full emission - 0.25F | 1 | 0 | 0 | 0 | 0 | 0 | 0 | 1 |
| Full emission - 0.50F | 1 | 0 | 0 | 0 | 0 | 0 | 1 | 0 |
| Full emission - 0.75F | 1 | 0 | 0 | 0 | 0 | 0 | 1 | 1 |
| Full emission - 1.00F | 1 | 0 | 0 | 0 | 0 | 1 | 0 | 0 |
| Full emission - 1.25F | 1 | 0 | 0 | 0 | 0 | 1 | 0 | 1 |
| Full emission - 1.50F | 1 | 0 | 0 | 0 | 0 | 1 | 1 | 0 |
| Full emission - 1.75F | 1 | 0 | 0 | 0 | 0 | 1 | 1 | 1 |
| Full emission - 2.00F | 1 | 0 | 0 | 0 | 1 | 0 | 0 | 0 |
| . | . | . | . | . | . | . | . | . |
| . | . | . | . | . | . | . | . | . |
| Full emission - 14.00F | 1 | 1 | 1 | 1 | 1 | 0 | 0 | 0 |
| Full emission - 14.25F | 1 | 1 | 1 | 1 | 1 | 0 | 0 | 1 |
| Full emission - 14.50F | 1 | 1 | 1 | 1 | 1 | 0 | 1 | 0 |
| Full emission - 14.75F | 1 | 1 | 1 | 1 | 1 | 0 | 1 | 1 |
| Full emission - 15.00F | 1 | 1 | 1 | 1 | 1 | 1 | 0 | 0 |
| Full emission - 15.25F | 1 | 1 | 1 | 1 | 1 | 1 | 0 | 1 |
| Full emission - 15.50F | 1 | 1 | 1 | 1 | 1 | 1 | 1 | 0 |
| Full emission - 15.75F | 1 | 1 | 1 | 1 | 1 | 1 | 1 | 1 |

TABLE 4

| Emission Frequency | D7 | D6 | D5 | D4 | D3 | D2 | D1 | D0 |
|---|---|---|---|---|---|---|---|---|
| 1 Hz | 1 | 0 | 0 | 0 | 0 | 0 | 0 | 0 |
| 2 Hz | 1 | 0 | 0 | 0 | 0 | 0 | 0 | 1 |
| 3 Hz | 1 | 0 | 0 | 0 | 0 | 0 | 1 | 0 |
| 4 Hz | 1 | 0 | 0 | 0 | 0 | 0 | 1 | 1 |
| 5 Hz | 1 | 0 | 0 | 0 | 0 | 1 | 0 | 0 |
| . | . | . | . | . | . | . | . | . |
| . | . | . | . | . | . | . | . | . |
| 55 Hz | 1 | 1 | 1 | 1 | 0 | 1 | 1 | 1 |
| 60 Hz | 1 | 1 | 1 | 1 | 1 | 0 | 0 | 0 |
| 70 Hz | 1 | 1 | 1 | 1 | 1 | 0 | 0 | 1 |
| 80 Hz | 1 | 1 | 1 | 1 | 1 | 0 | 1 | 0 |
| 90 Hz | 1 | 1 | 1 | 1 | 1 | 0 | 1 | 1 |
| 100 Hz | 1 | 1 | 1 | 1 | 1 | 1 | 0 | 0 |
| 125 Hz | 1 | 1 | 1 | 1 | 1 | 1 | 0 | 1 |
| 150 Hz | 1 | 1 | 1 | 1 | 1 | 1 | 1 | 0 |
| 200 Hz | 1 | 1 | 1 | 1 | 1 | 1 | 1 | 1 |

In step S1006, the radio wave transmitting part 110 is caused to start to transmit the light emission data set in step S1005 from the antenna 109 by radio wave, and then the process proceeds to step S1004. For example, in the case in which the set light emission data designates channel 1 (CH1), whole group light emission, one shot light emission, and "light emission amount"="full emission minus 1", the data in which the first-byte=10011100 and the second-byte=10000100 is transmitted in accordance with Table 1 and Table 2. In this case, the waveform transmitted from the radio wave transmitting part is as waveform (D) shown in FIG. 3.

In step S1004, the communication interrupt process is ended, and the process returns to the main routine.

In this embodiment, the waveforms of the radio wave communications are show under an FM (frequency modulation) system. However, it is also possible to utilize other communication systems such as an AM (amplitude modulation) system or a spread spectrum system.

In the following, a description will be made, with reference to the flow chart shown in FIG. 8, of an operation on the occasion of transmission of a light emission start signal from the transmitter.

Figure 3:
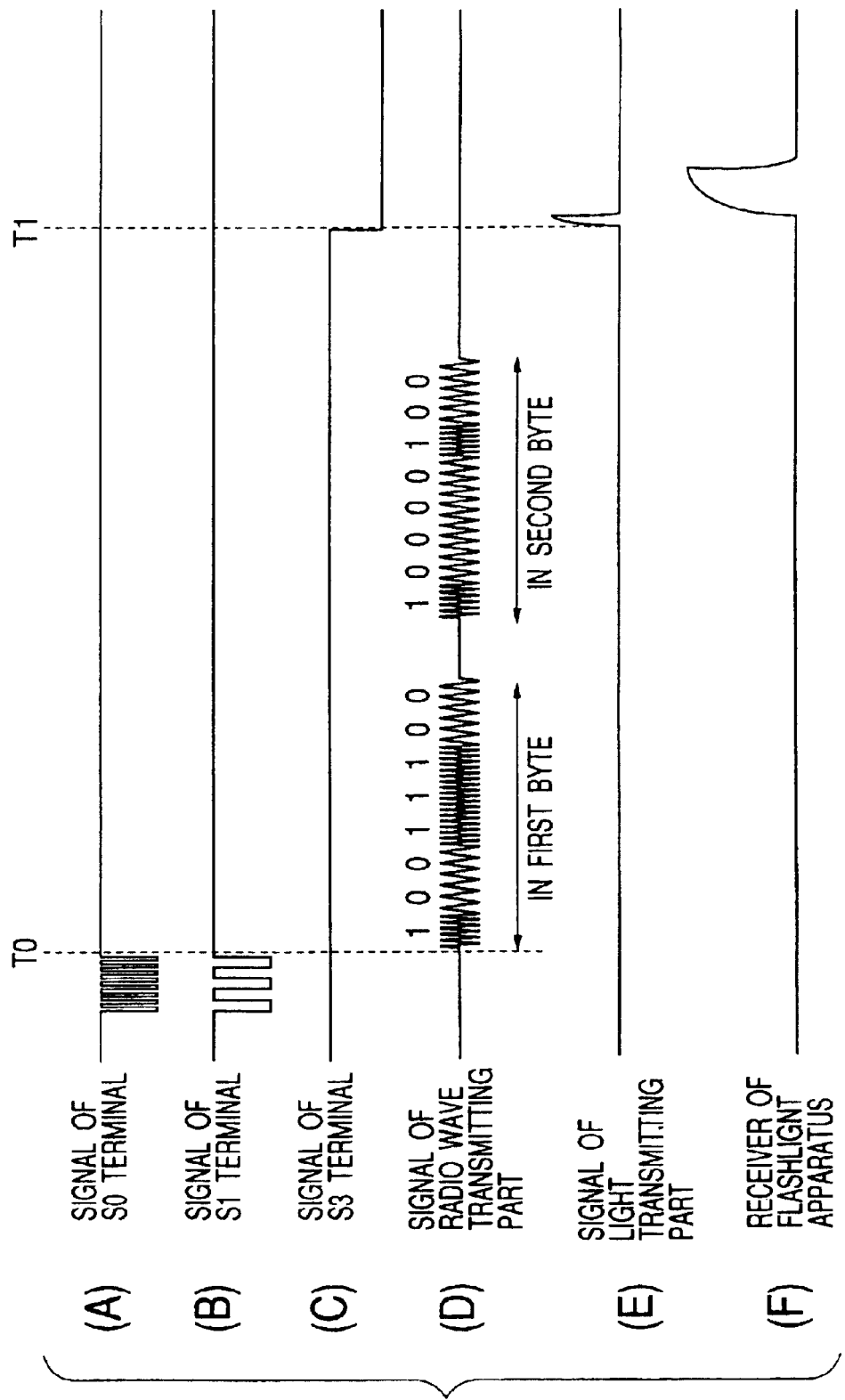
FIG. 3 is a chart showing waveforms at various parts of the transmitter and the receiver in the first embodiment of the present invention.

When a release switch 121 of the camera body 120 is operated, the level at the terminal S3 in the communication terminals 108 for the camera body and the microcomputer 107 of the transmitter changes from H (high) level to L (low) level, and the camera body 120 outputs a light emission start signal to the microcomputer 107 of the transmitter (at time T1 in FIG. 3.). In response to that fall of the level at the terminal S3 from H to L, the microcomputer 107 of the transmitter generates an interrupt for a communication of the light emission start signal (step S1101).

In step S1102, the microcomputer 107 of the transmitter outputs a H level signal to the light emission control circuit 106 so as to turn the light emission control circuit 106 into the conductible state, with which a discharge loop composed of the anode of the main condenser 103—the discharge tube 105—the light emission control circuit 106—the cathode of the main condenser 103 is formed.

In step S1103, the microcomputer 107 of the transmitter outputs an H level signal to the trigger circuit 104 for a predetermined time. In response to this, the trigger circuit 104 applies a high voltage to the discharge tube 105, and the discharge tube 105 starts to emit light. This light emission serves as a signal (light emission start signal) for causing the receiver to start a light emission of the receiver.

In step S1104, a light communication pulse timer for measuring a time period required for forming a light pulse of the light emission start signal by the discharge tube 105 is started. In step S1105, it is determined whether the light communication pulse timer has counted a predetermined time, and when the predetermined time has elapsed, the process proceeds to step S1106.

In step S1106, the microcomputer 107 of the transmitter outputs an L level signal to the light emission control circuit 106 to turn the light emission control circuit 106 into the non-conductible state, with which the discharge loop composed of the anode of the main condenser 103—the discharge tube 105—the light emission control circuit 106—the cathode of the main condenser 103 is shut off, and the discharge tube stops the light emission.

In step S1107, the interrupt process is ended, and the process returns to the main routine. In connection with the above-described process, the waveform of the light emission by the discharge tube 105 of the transmitter and its light emission timing will be seen in waveform (E) in FIG. 3. While in this embodiment, a predetermined light pulse is used as the light emission start signal, flashing of the flash apparatus functioning as the transmitter at the time of photographing may also be used as the light emission start signal alternatively.

In the following, a description will be made, with reference to the flow chart shown in FIGS. 9A and 9B, of an operation of the receiver.

The radio wave (carrying light emission data) transmitted from the antenna 109 of the transmitter as described above is received through the antenna 209 of the receiver. The received radio wave is converted-by the radio wave receiving part 210 and output to the microcomputer 207 of the receiver. When the received data amount from the radio wave receiving part reaches one byte, the microcomputer 207 of the receiver generates an interrupt for communication (step S1201).

In step S1202, it is determined whether or not the data is within the first byte of the communication data. When it is determined in step S1202 that the data is within the first byte, the process proceeds to step S1207, while when it is determined that the data is not within the first byte, the process proceeds to step S1203. In step S1207, when it is determined that the received communication data is command cancel data (i.e. in the first byte, D2, D1, D0=0, 0, 0 as shown in Table 1), the process proceeds to step S1210, while when it is determined that the received communication data is not the command cancel data, the process proceeds to step S1208.

In step S1210, a light emission start signal wait flag FLG is set to 0, and it is also set that the communication data length is 1 (one) byte and the next data is to be in the first byte (Table 1). Then the process proceeds to step S1206.

In step S1208, it is determined whether or not the received data is multi shot emission data (i.e. in the first byte, D2, D1, D0=1, 1, 0 as shown in Table 1). When it is determined that the received data is the multi shot emission data, the process proceeds to step S1209, while when it is determined that the received data is not the multi shot emission preparation data, the process proceeds to step S1211.

In step S1211, it is set that the communication data length is 2 bytes and the next data is to be in the second byte (Table 1), and the process proceeds to step S1206. In step 109, it is set that the communication data length is 4 bytes (since when the multi shot emission is to be performed, the communication would amount to 4 bytes) arid the next data is to be in the second byte, and then the process proceeds to step S1206.

In step S1203, it is determined whether or not the data is within the second byte of the communication data. When it is determined that the data is within the second byte, the process proceeds to step S1212, while when it is determined that the data is not within the second byte, the process proceeds to step S1204. In step S1212, the light emission amount (shown in Table 2) designated by the second byte is set, and then the process proceeds to step S1213.

In step 1213, it is determined whether or not the data length is 2 bytes. When it is determined that the data length is 2 bytes, the process proceeds to step S1215, while when it is determined that the data length is not 2 bytes, the process proceeds to step S1214. In step S1214, it is set that the next data is to be in the third byte, and the process proceeds to step S1206. On the other hand, in step S1215, it is set that the next data is to be in the first byte, and the process proceeds to step S1216.

In step S1216, it is determined whether or not the channel (CH) and the light emission group obtained by the first byte of the communication data coincide with the data set in the receiver. If it is determined that they coincide with the set data, the process proceeds to step S1218, while if it is determined that they do not coincide with the set data, the process proceeds to step S1217. In step S1217, the light emission start signal wait flag FLG is set to 0, and the process proceeds to step S1206. In step S1218, the light emission start signal wait flag FLG is set to 1, in other words, the receiver is set to a light emission preparation state, and then the process proceeds to step S1206.

In step S1204, it is determined whether or not the data is within the third byte of the communication data. When it is determined that the data is within the third byte, the process proceeds to step S1223, while when it is determined that the data is not within the third byte, the process proceeds to step S1205. In step S1223, the number of times of emission in the multi shot light emission (shown in Tables 1 and 3) obtained from the third byte of the communication data is set, and it is set that the next data is to be in the fourth byte. Then, the process proceeds to step S1206.

In step S1205, it is determined whether or not the data is within the fourth byte of the communication data. When it is determined that the data is within the fourth byte, the process proceeds to step S1219, while when it is determined that the data is not within the fourth byte, the process proceeds to step S1206. In step S1219, the frequency of emission in the multi shot light emission (shown in Tables 1 and 3) obtained from the fourth byte of the communication data is set, and it is set that the next data is to be in the first byte. Then, the process proceeds to step S1220.

In step S1220, it is determined whether or not the channel (CH) and the light emission group obtained by the first byte of the communication data coincide with the data set in the receiver. When it is determined that they coincide with the set data, the process proceeds to step S1222, while when it is determined that they do not coincide with the set data, the process proceeds to step S1221. In step S1221, the light emission start signal wait flag FLG is set to 0, and the process proceeds to step S1206.

In step S1222, the light emission start signal wait flag FLG is set to 1, and the process proceeds to step S1206.

In step S1206, the interrupt process is stopped, and the process returns to the main routine.

In the following, a description will be made, with reference to the flow chart shown in FIG. 10, of an interrupt process in the receiver on the occasion of receiving light (i.e. a light emission start signal) emitted from the discharge tube 105 of the transmitter with the light receiving sensor 211.

When the transmitter (with discharge tube 105) transmits a light pulse of the light emission start signal at time T1 indicated in FIG. 3, the light receiving part 211 outputs an electrical signal responsive to the received light pulse to the microcomputer 207 of the receiver. Upon receiving this output, the microcomputer 207 of the receiver starts an interrupt process (in step S1301).

In step S1302, it is determined whether or not the light emission start signal wait flag ELG is 1. If it is determined that the light emission start signal wait flag FLG is 1, the process proceeds to step S1304, while if the flag FLG is not 1, the process proceeds to step S1303. In step S1304, a receiver light emission process subroutine is called, and the receiver performs a light emitting operation.

In the following, the receiver light emission process subroutine will be described with reference to the flow chart shown in FIG. 12. The process starts in step S1501. In step S1502, the microcomputer 207 of the receiver outputs an H level signal to the light emission control circuit 206 to turn the light emission control circuit 206 into the conductible state, with which a discharge loop composed of the anode of the main condenser 203—the discharge tube 205—the light emission control circuit 206—the cathode of the main condenser 203 is formed.

In step S1503, the microcomputer 207 of the receiver outputs an H level signal to the trigger circuit 204 for a predetermined time. In response to this, the trigger circuit 204 applies a high voltage to the discharge tube 205, and the discharge tube 205 starts to emit light.

In step S1504, a light emission amount timer for measuring a time period during which the light emission control circuit 206 is in the on-state (i.e. in the conductible state) corresponding to a prescribed light amount obtained by the above-mentioned communication with the transmitter is started.

In step S1505, it is determined whether the light emission amount timer has counted a predetermined time that gives the prescribed light emission amount of the discharge tube 205, and when it is determined that the predetermined time has elapsed, the process proceeds to step S1506.

In step S1506, the microcomputer 207 of the receiver outputs an L level signal to the light emission control circuit 206 to turn the light emission control circuit 106 into the non-conductible state, with which the discharge loop composed of the anode of the main condenser 203—the discharge tube 205—the light emission control circuit 206—the cathode of the main condenser 203 is shut off, and the discharge tube 205 stops the light emission.

Figure 10:
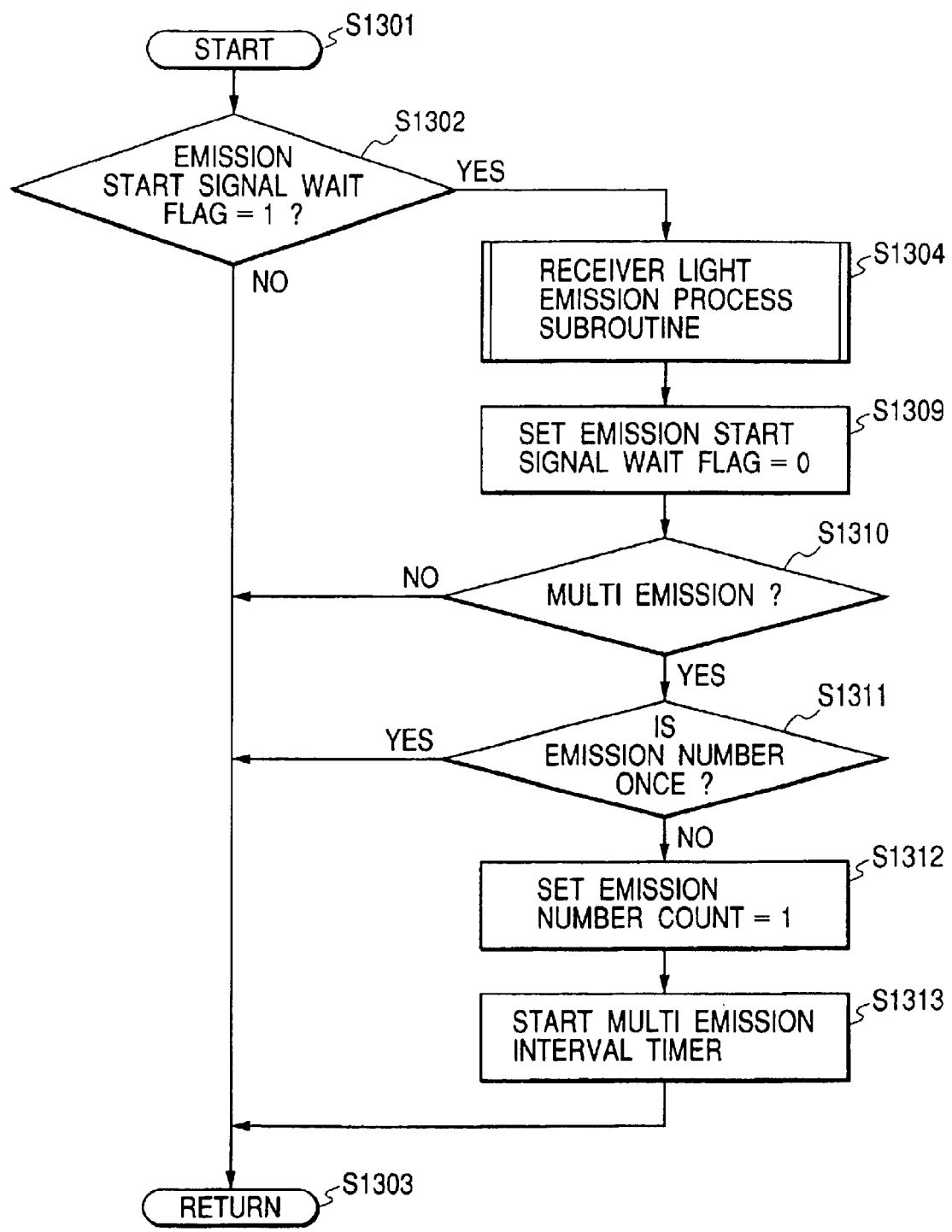
FIG. 10 is a flow chart showing an operation of the receiver on the occasion of receiving a light emission start signal in the first embodiment of the present invention.

In step S1507, the subroutine is ended, and the process returns to step S1309 in the flow chart of FIG. 10. In connection with the above-described process, the waveform of the light emission by the receiver (i.e. the slave flash apparatus) in the receiver light emission process subroutine and its light emission timing will be seen in waveform (F) in FIG. 3.

In step S1309, the light emission start signal wait flag FLG is set to 0 in order for the receiver to be prevented from emitting light erroneously after the light emission. In step S1310, it is determined whether or not the light emission mode set by the above-mentioned communication with the transmitter is the multi shot light emission mode. If it is determined that the set light emission mode is the multi shot emission mode, the process proceeds to step S1311, while if it is determined that the set mode is not the multi shot emission mode, the process proceeds to step S1303.

In step 1311, it is determined whether or not the number of times of emission in the multi shot light emission set by the communication is one. If it is determined that the number of times of emission is one, the process proceeds to step S1303, while if it is determined that the number of times of emission is not one, the process proceeds to step S1312. In step S1312, count of the number of times of multi shot light emission is set to 1, and the process proceeds to step S1313.

In step S1313, a multi shot emission interval timer, which generates timer interrupts at a light emission interval corresponding to the frequency of the multi shot light emission set by the above-mentioned communication with the transmitter, is started, and the process proceeds to step S1303. In step S1303, the interrupt process is ended and the process returns to the main routine. With the completion of the above process, the light emission process in the case of the one shot light emission or the first light emission process in the case of the multi shot light emission is completed.

Next, the second and subsequent light emission processes in the multi shot light emission will be described with reference to the flow chart shown in FIG. 11. When the multi light emission interval timer started in step S1313 in the flow chart of FIG. 10 has counted a set time period, an interrupt is generated (in step S1401).

Figure 12:
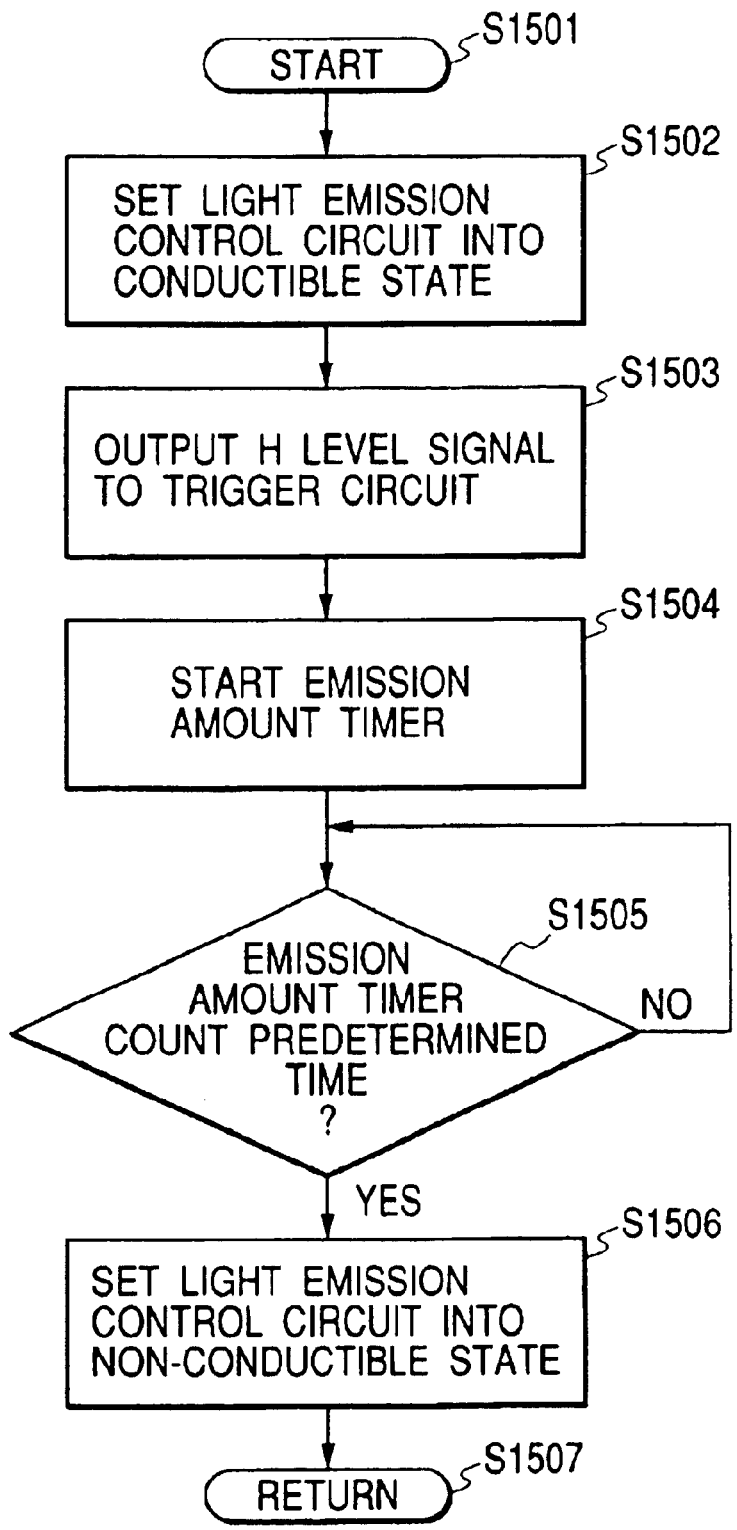
FIG. 12 is a flow chart showing an operation of light emission of the receiver in the first embodiment of the present invention.

In step S1402, the receiver light emission process subroutine is called, and a light emitting operation is performed following the flow shown in FIG. 12. Upon completion of the light emitting operation, the process proceeds to step S1407.

In step S1407, it is determined whether or not the emission has been completed the number of times set by the above-mentioned communication with the transmitter. If it is determined that the emission has been completed the set number of times, the process proceeds to step S1408, while if the emission has not been completed the set number of times, the process proceeds to step S1410. In step S1408, the multi light emission interval timer is stopped, and the process proceeds to step S1409.

In step S1410, the count of the number of times of multi shot light emission is incremented by 1, and the process proceeds to step S1409. In step S1409, the interrupt process is ended, and the process proceeds to step S1303.

Next, in the following, a light emitting system as a second embodiment of the present invention will be described. The structure of this light emitting system is the same as that of the light emitting system shown in FIGS. 1A and 1B.

Figure 7:
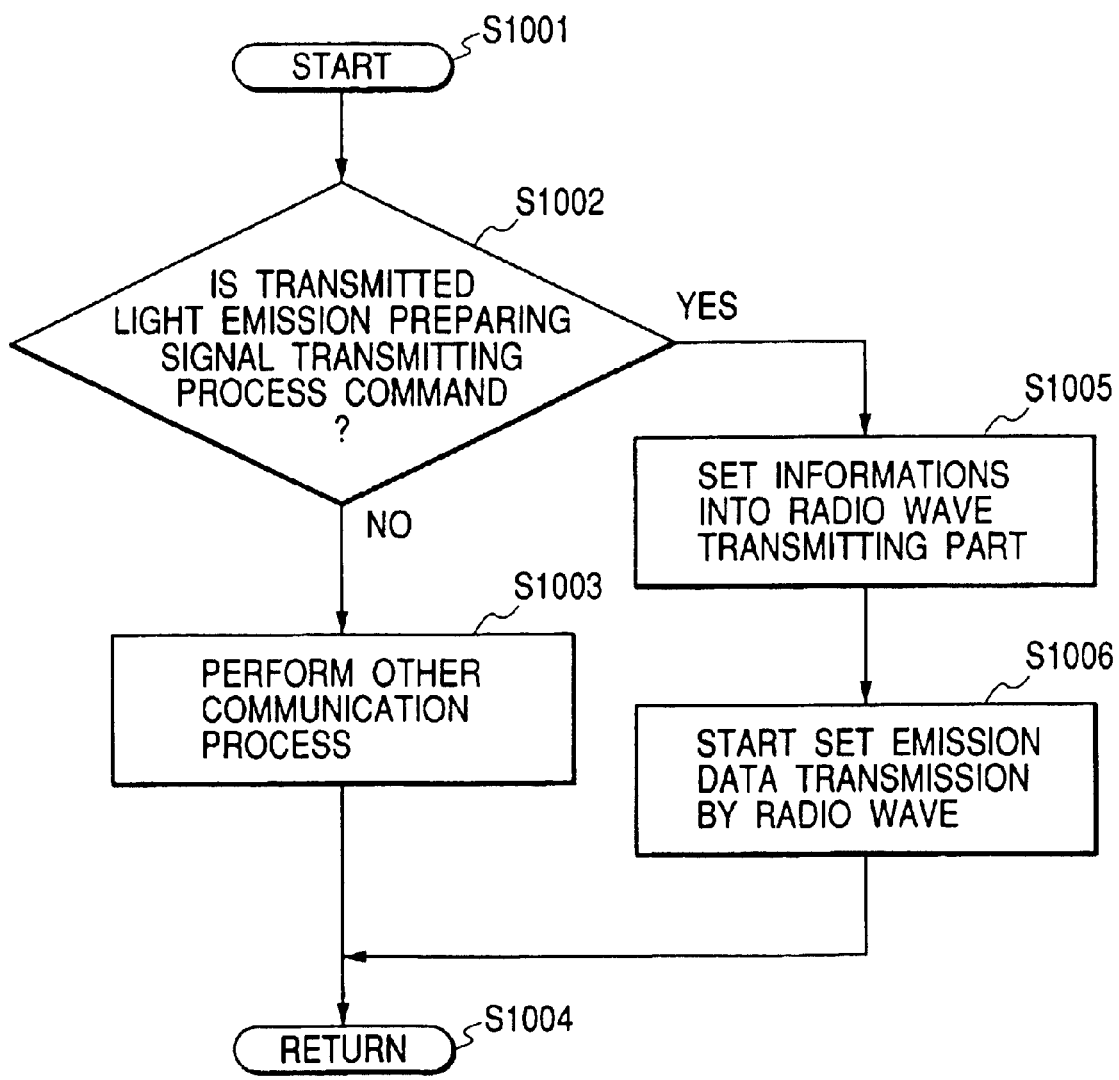
FIG. 7 is a flow chart showing a operation of a communication process of the transmitter and a camera in the first embodiment of the present invention.

In the light emitting system according to the second embodiment, the communication operation between the camera body 120 and the microcomputer 107 of the transmitter is the same as that shown in the flow chart of FIG. 7. Namely, when a communication command sent from the camera body is a light emission preparation signal transmission command, the transmitter transmits a light emission preparation signal to the receiver through the antenna 109 (in other words, from the radio wave transmitting part 110) (waveform (D) shown in FIG. 4). In connection with this, in the transmission format in this embodiment, a light emission start command (i.e., in the first byte, D2, D1, D0=1, 1, 1) is added.

In the following, a description will be made, with reference to the flow chart shown in FIG. 13, of an operation on the occasion of transmission of the light emission start signal by the transmitter.

Figure 4:
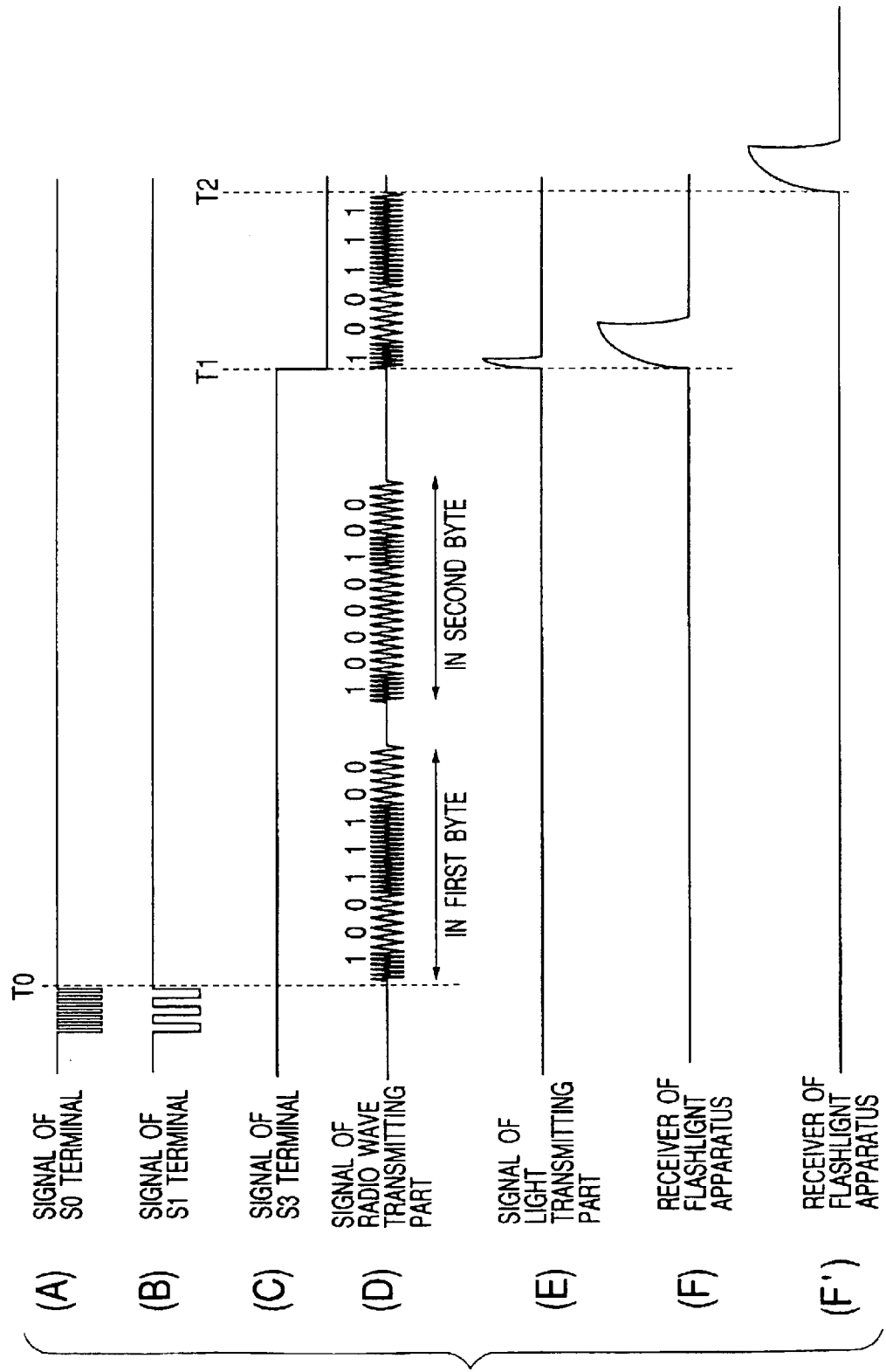
FIG. 4 is a chart showing waveforms at various parts of the transmitter and the receiver in the second embodiment of the present invention.

When the release switch 121 of the camera 120 is operated, the level at the terminal S3 in the communication terminals 108 for the camera body and the microcomputer 107 of the transmitter changes from H (high) level to L (low) level, and the camera body 120 outputs a light emission start signal to the microcomputer 107 of the transmitter (at time T1 in FIG. 4). In response to that fall of the level at the terminal S3 from H to L, the microcomputer 107 of the transmitter generates an interrupt for communication of the light emission start signal (step S2101).

In step S2102, information (i.e. light emission data) on the channel (CH) of the wireless communication, light emission groups, and emission start set in the transmitter 107 or in the camera body 120 is set in the radio wave transmitting part 110 in accordance with the format indicated in the following Tables 5 through 8.

TABLE 5

| Command Name | First byte D7 | D6 | D5 | D4 | D3 | D2 | D1 | D0 | Second byte | Third byte | Fourth byte |
|---|---|---|---|---|---|---|---|---|---|---|---|
| CH1 | 1 | 0 | 0 | — | — | — | — | — | | | |
| CH2 | 1 | 0 | 1 | — | — | — | — | — | | | |
| CH3 | 1 | 1 | 0 | — | — | — | — | — | | | |
| CH4 | 1 | 1 | 1 | — | — | — | — | — | | | |
| Group A | — | — | — | 0 | 0 | — | — | — | | | |
| Group B | — | — | — | 0 | 1 | — | — | — | | | |
| Group C | — | — | — | 1 | 0 | — | — | — | | | |
| Whole group | — | — | — | 1 | 1 | — | — | — | | | |
| One shot emission preparation | — | — | — | — | — | 1 | 0 | 0 | Emission amount | | |
| Multi shot emission preparation | — | — | — | — | — | 1 | 1 | 0 | Emission amount | Emission number | Emisson frequency |
| Command cancel | — | — | — | — | — | 0 | 0 | 0 | | | |
| Emission start | — | — | — | — | — | 1 | 1 | 1 | | | |

TABLE 6

| Emission Amount | D7 | D6 | D5 | D4 | D3 | D2 | D1 | D0 |
|---|---|---|---|---|---|---|---|---|
| Full emission | 1 | 0 | 0 | 0 | 0 | 0 | 0 | 0 |
| Full emission - 0.25F | 1 | 0 | 0 | 0 | 0 | 0 | 0 | 1 |
| Full emission - 0.50F | 1 | 0 | 0 | 0 | 0 | 0 | 1 | 0 |
| Full emission - 0.75F | 1 | 0 | 0 | 0 | 0 | 0 | 1 | 1 |
| Full emission - 1.00F | 1 | 0 | 0 | 0 | 0 | 1 | 0 | 0 |
| Full emission - 1.25F | 1 | 0 | 0 | 0 | 0 | 1 | 0 | 1 |
| Full emission - 1.50F | 1 | 0 | 0 | 0 | 0 | 1 | 1 | 0 |
| Full emission - 1.75F | 1 | 0 | 0 | 0 | 0 | 1 | 1 | 1 |
| Full emission - 2.00F | 1 | 0 | 0 | 0 | 1 | 0 | 0 | 0 |
| . | . | . | . | . | . | . | . | . |
| . | . | . | . | . | . | . | . | . |
| . | . | . | . | . | . | . | . | . |
| Full emission - 14.00F | 1 | 1 | 1 | 1 | 1 | 0 | 0 | 0 |
| Full emission - 14.25F | 1 | 1 | 1 | 1 | 1 | 0 | 0 | 1 |
| Full emission - 14.50F | 1 | 1 | 1 | 1 | 1 | 0 | 1 | 0 |
| Full emission - 14.75F | 1 | 1 | 1 | 1 | 1 | 0 | 1 | 1 |
| Full emission - 15.00F | 1 | 1 | 1 | 1 | 1 | 1 | 0 | 0 |
| Full emission - 15.25F | 1 | 1 | 1 | 1 | 1 | 1 | 0 | 1 |
| Full emission - 15.50F | 1 | 1 | 1 | 1 | 1 | 1 | 1 | 0 |
| Full emission - 15.75F | 1 | 1 | 1 | 1 | 1 | 1 | 1 | 1 |

TABLE 7

| Number of Emission | D7 | D6 | D5 | D4 | D3 | D2 | D1 | D0 |
|---|---|---|---|---|---|---|---|---|
| — | 1 | 0 | 0 | 0 | 0 | 0 | 0 | 0 |
| Once | 1 | 0 | 0 | 0 | 0 | 0 | 0 | 1 |
| Twice | 1 | 0 | 0 | 0 | 0 | 0 | 1 | 0 |
| Three times | 1 | 0 | 0 | 0 | 0 | 0 | 1 | 1 |
| Four times | 1 | 0 | 0 | 0 | 0 | 1 | 0 | 0 |
| Five times | 1 | 0 | 0 | 0 | 0 | 1 | 0 | 1 |
| . | . | . | . | . | . | . | . | . |
| Fifty-five times | 1 | 1 | 1 | 1 | 0 | 1 | 1 | 1 |
| Fifty-six times | 1 | 1 | 1 | 1 | 1 | 0 | 0 | 0 |
| Fifty-seven times | 1 | 1 | 1 | 1 | 1 | 0 | 0 | 1 |
| Fifty-eight times | 1 | 1 | 1 | 1 | 1 | 0 | 1 | 0 |
| Fifty-nine times | 1 | 1 | 1 | 1 | 1 | 0 | 1 | 1 |
| Sixty times | 1 | 1 | 1 | 1 | 1 | 1 | 0 | 0 |
| Sixty-one times | 1 | 1 | 1 | 1 | 1 | 1 | 0 | 1 |
| Sixty-two times | 1 | 1 | 1 | 1 | 1 | 1 | 1 | 0 |
| Sixty-three times | 1 | 1 | 1 | 1 | 1 | 1 | 1 | 1 |

TABLE 8

| Emission Frequency | D7 | D6 | D5 | D4 | D3 | D2 | D1 | D0 |
|---|---|---|---|---|---|---|---|---|
| 1 Hz | 1 | 0 | 0 | 0 | 0 | 0 | 0 | 0 |
| 2 Hz | 1 | 0 | 0 | 0 | 0 | 0 | 0 | 1 |
| 3 Hz | 1 | 0 | 0 | 0 | 0 | 0 | 1 | 0 |
| 4 Hz | 1 | 0 | 0 | 0 | 0 | 0 | 1 | 1 |
| 5 Hz | 1 | 0 | 0 | 0 | 0 | 1 | 0 | 0 |
| . | . | . | . | . | . | . | . | . |
| 55 Hz | 1 | 1 | 1 | 1 | 0 | 1 | 1 | 1 |
| 60 Hz | 1 | 1 | 1 | 1 | 1 | 0 | 0 | 0 |
| 70 Hz | 1 | 1 | 1 | 1 | 1 | 0 | 0 | 1 |
| 80 Hz | 1 | 1 | 1 | 1 | 1 | 0 | 1 | 0 |
| 90 Hz | 1 | 1 | 1 | 1 | 1 | 0 | 1 | 1 |
| 100 Hz | 1 | 1 | 1 | 1 | 1 | 1 | 0 | 0 |
| 125 Hz | 1 | 1 | 1 | 1 | 1 | 1 | 0 | 1 |
| 150 Hz | 1 | 1 | 1 | 1 | 1 | 1 | 1 | 0 |
| 200 Hz | 1 | 1 | 1 | 1 | 1 | 1 | 1 | 1 |

In step S2103, the radio wave transmitting part 110 is caused to start to transmit the light emission data set in step S2102 from the antenna 109 by radio wave, and then the process proceeds to step S2104. For example, in the case in which the set light emission data designates channel 1 (CH1), whole group light emission, and emission start, the data in which the first-byte=10011111 is transmitted in accordance with Table 5. In this case, the waveform transmitted from the radio wave transmitting part is as waveform (D) in FIG. 4.

In step S2104 the microcomputer 107 of the transmitter outputs a H level signal to the light emission control circuit 106 so as to turn the light emission control circuit 106 into the conductible state, with which a discharge loop composed of the anode of the main condenser 103—the discharge tube 105—the light emission control circuit 106—the cathode of the main condenser 103 is formed.

In step S2105, the microcomputer 107 of the transmitter outputs an H level signal to the trigger circuit 104 for a predetermined time. In response to this, the trigger circuit 104 applies a high voltage to the discharge tube 105, and the discharge tube 105 starts to emit light. This light emission serves as a signal (light emission start signal) for causing the receiver to start light emission.

In step S2106, a light communication pulse timer for measuring a time period required for forming a light pulse of the light emission start signal by the discharge tube 105 is started. In step S2107, it is determined whether the light communication pulse timer has counted a predetermined time, and when it is determined that the predetermined time has elapsed, the process proceeds to step S2108.

In step S2108, the microcomputer 107 of the transmitter outputs an L level signal to the light emission control circuit 106 to turn the light emission control circuit 106 into the non-conductible state, with which the discharge loop composed of the anode of the main condenser 103—the discharge tube 105—the light emission control circuit 106—the cathode of the main condenser 103 is shut off, and the discharge tube stops the light emission.

In step S2109, the interrupt process is ended, and the process returns to the main routine. In connection with the above-described process, the waveform of the light emission by the discharge tube 105 of the transmitter and its light emission timing will be seen in waveform (E) in FIG. 4. It will be understood that the transmission through the light transmitting part is completed earlier than the transmission through the radio wave transmitting part. While in this embodiment, a predetermined light pulse is used as the light emission start signal, flashing of the flash apparatus functioning as the transmitter at the time of photographing may be used as the light emission start signal.

In the following, a description will be made of an operation of the receiver with reference to the flow chart shown in FIGS. 14A and 14B.

The radio wave (carrying light emission data) transmitted from the antenna 109 of the transmitter as described above is received through the antenna 209 of the receiver. The received radio wave is converted by the radio wave receiving part 230 and output to the microcomputer 207 of the receiver. When the received data amount from the radio wave receiving part reaches one byte, the microcomputer of the receiver generates an interrupt for communication (step S2201), arid the process proceeds to step S2230.

In step S2230, it is determined whether or not the light emission start signal wait flag FLG is 1. When it is determined that the flag FLG is 1, in other words, when in a state for waiting receiving of the light emission start signal, the process proceeds to step S2231, while when it is determined that the flag FLG is not 1, in other words, the communication comprises the light emission preparation signal, the process proceeds to step S2202.

Figure 9B:
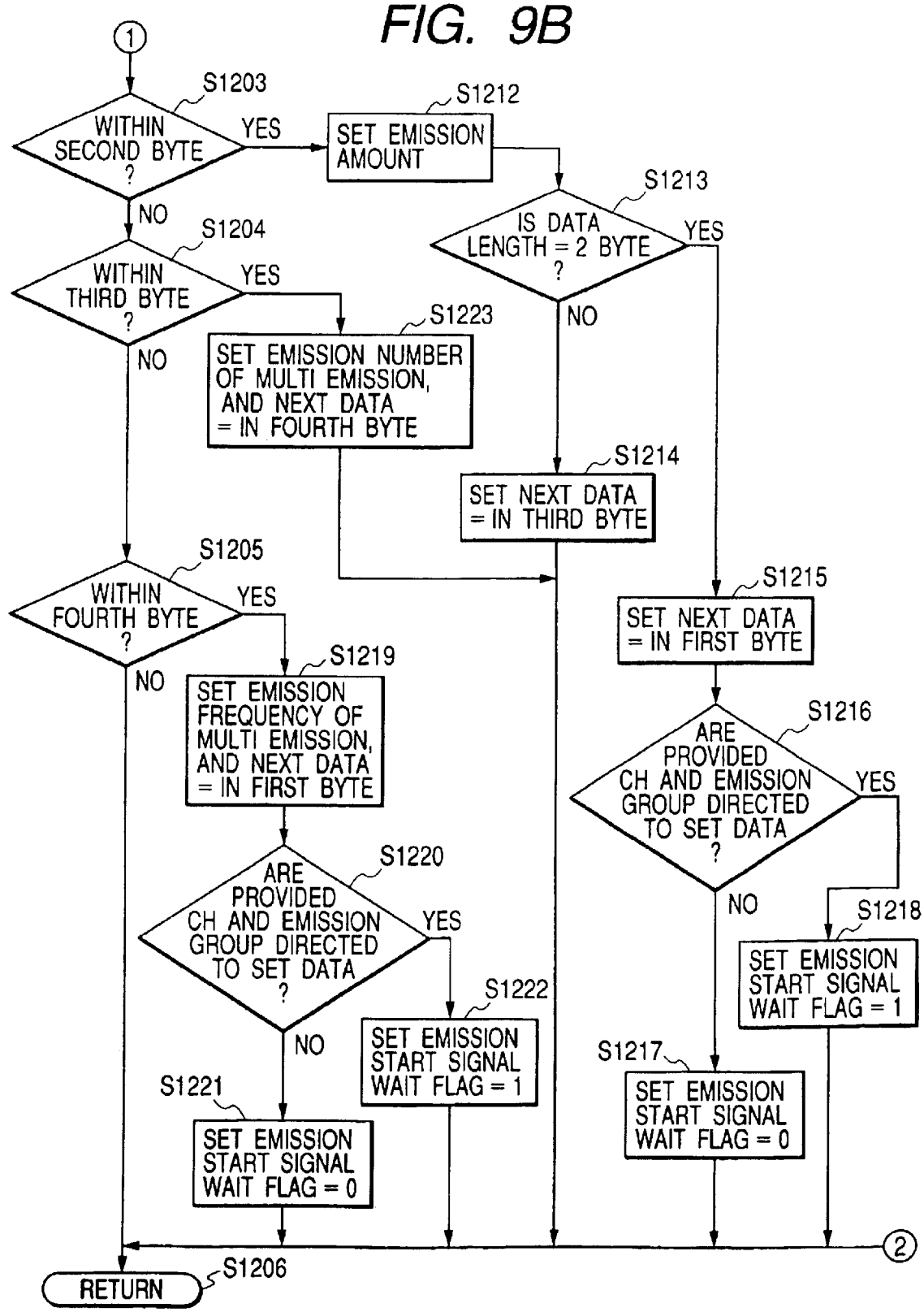
FIG. 9 is comprised of FIGS. 9A and 9B showing a flow chart of an operation of the receiver on the occasion of receiving a light emission preparation signal in the first embodiment of the present invention.

The process of steps S2202 through S2223 is the same as the process of steps S1202 through S1223 in the flow chart of FIGS. 9A and 9B.

Figure 11:
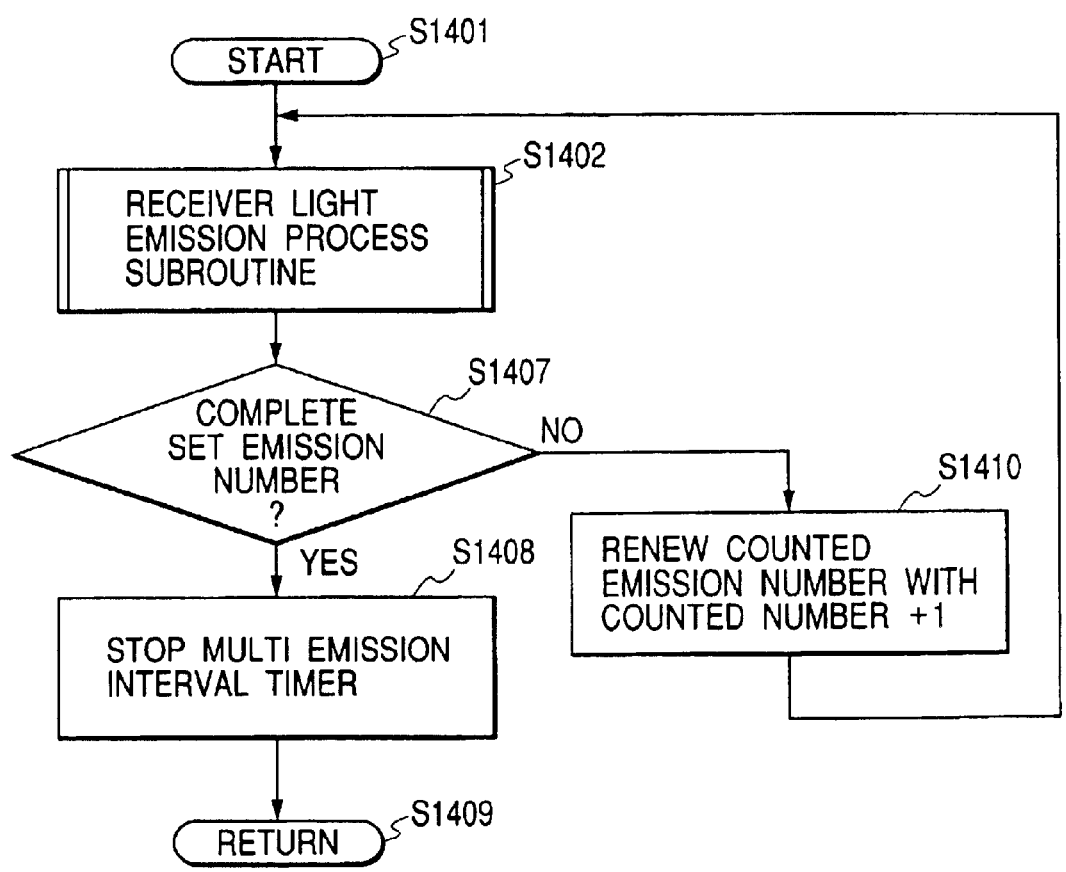
FIG. 11 is a flow chart showing an operation of a multi shot light emission of the receiver in the first embodiment of the present invention.

The interrupt process in the receiver on the occasion of receiving a light pulse of the light emission start signal from the transmitter through the light receiving sensor 211 (or light receiving part 212) is the same as the process shown in the flow charts of FIGS. 10 to 12. The waveform of the emitted light of the receiver in the case in which the transmitter transmits the light pulse of the light emission start signal at time T1 in FIG. 4 is shown as waveform (F) in FIG. 4.

In the following, a description will be made of the process in the case in which the receiver cannot receive the light pulse of the light emission start signal from the transmitter (i.e. the discharge tube 105), with reference to the process in step S2231 and subsequent steps in the flow chart of FIGS. 14A and 14B.

In this embodiment, when the receiver receives the light pulse of the light emission start signal from the transmitter through the light receiving sensor 211, a light emitting operation will be performed based on an output of the light receiving part 212 and the light emission start signal wait flag FLG is set to 0 in step S1309 in the flow chart of FIG. 10. Therefore, the light emitting operation is not performed even if the receiver receives the light emission start signal by radio wave. On the other hand, when the receiver cannot receive the light pulse of the light emission start signal from the transmitter through the light receiving sensor 211, the receiver is adapted to perform the light emitting operation upon receiving the light emission start signal from the transmitter by radio wave. In the following, a description will be made of an operation of the receiver on the occasion of receiving the light emission start signal by radio wave.

In step S2231, if the channel (CH) and the light emission group obtained by the communication data coincide with the data set in the receiver and the communication data includes the light emission start signal (i.e. D2, D1, D0=1, 1, 1 as shown in Table 5), the process proceeds to step S2233, while if the above conditions are not met, the process proceeds to step S2232.

In step S2232, it is set that the next data is to be in the first byte and the process proceeds to step S2206. In step S2233, a light emitting operation in accordance with the flow chart of FIG. 15 (which will be described later) is called. After the light emitting operation is completed, the process proceeds to step S2234. In step S2234, the light emission start signal wait flag FLG is set to 0, and it is set that the next data is to be in the first byte. Then, the process proceeds to step S2206.

Figure 15:
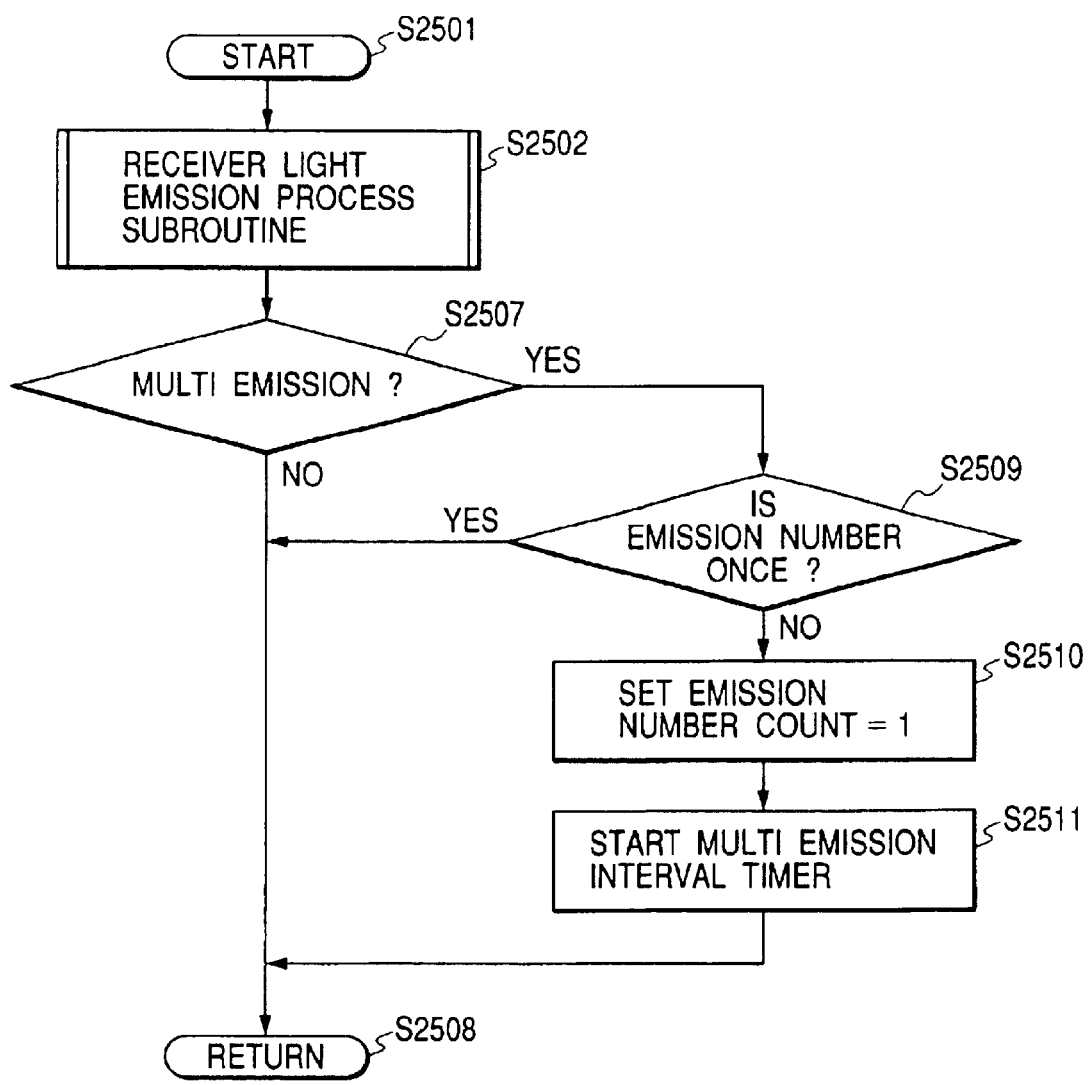
FIG. 15 is a flow chart showing an operation of the receiver on the occasion of receiving a light emission start signal in the second embodiment of the present invention.

In the following, a description will be made, with reference to the flow chart shown in FIG. 15, of the light emitting operation called in step S2233.

The process starts in step S2501. In step S2502, the receiver light emission process subroutine shown in the flow chart of FIG. 12 is called, so that the light emitting operation is performed. After the light emitting operation is completed, the process proceeds to step S2507.

In connection with the above-described process, the waveform of the light emission by the receiver (i.e. the slave flash apparatus) in the case in which the light emission is activated by the light emission start signal transmitted by the radio wave transmitting part 110 and the timing of the light emission will be seen in waveform (F) in FIG. 4.

In step S2507, it is determined whether or not the light emission mode set by the communication with the transmitter is the multi shot light emission mode. If it is determined that the set light emission mode is the multi shot emission mode, the process proceeds to step S2509, while if it is determined that the set mode is not the multi shot emission mode, the process proceeds to step S2508. In step S2509, it is determined whether the number of times of emission in the multi shot light emission set by the communication is one. If it is determined that the number of times of emission is one, the process proceeds to step S2508, while if it is determined that the number of times of emission is not one, the process proceeds to step S2510.

In step S2510, count of the number of times of multi shot light emission is set to 1, and the process proceeds to step S2511. In step S2511, a multi shot emission interval timer, which generates timer interrupts at a light emission interval corresponding to the frequency of the multi shot light emission set by the communication with the transmitter, is started, and the process proceeds to step S2508.

Figure 14B:
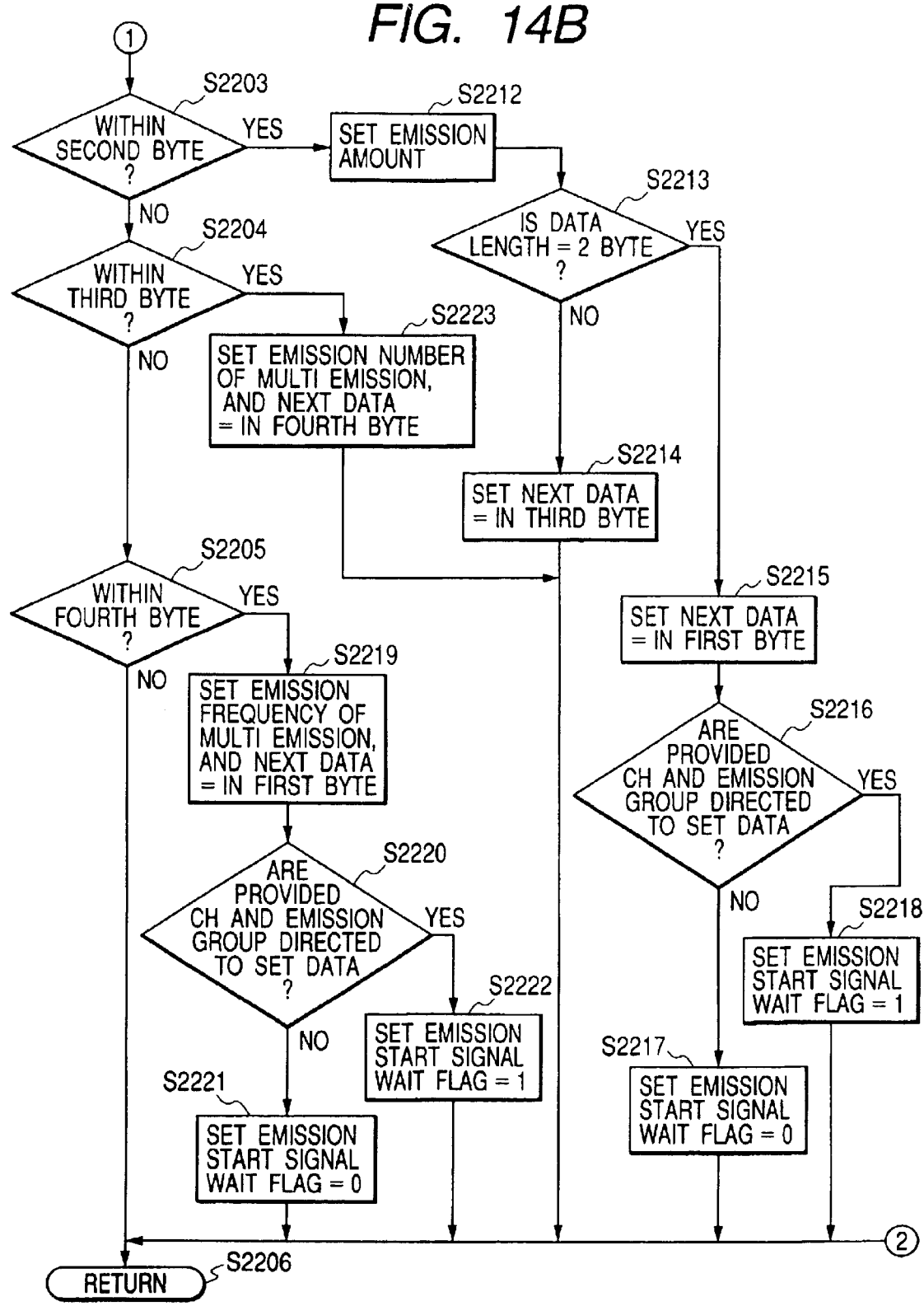
FIG. 14 is comprised of FIGS. 14A and 14B showing a flow chart of an operation of the receiver on the occasion of receiving a radio wave signal in the second embodiment of the invention.

In step S2508, the light emission process is ended and the process proceeds to step S2234 in the flow chart of FIGS. 14A and 14B. With the completion of the above process, the light emission process in the case of the one shot light emission or the first light emission process in the case of the multi shot light emission is completed. The second and subsequent light emission processes in the multi shot light emission are the same as the process shown in the flow chart of FIG. 11.

It should be noted that, if the light receiving sensor 211 of the receiver receives a light pulse of the light emission start signal from the transmitter, it is desirable that the microcomputer 207 of the receiver should not use the output of the radio wave receiving part for a predetermined time after the receiving of the light pulse or after the light emission of the flash apparatus of the receiver, for example, until transmission of the light emission start signal from the radio wave transmitting part is completed. This is desirable in order to prevent the light emission start signal wait flag FLG from being set to 1 again by the light emission start signal from the radio wave transmitting part after the light emission of the flash apparatus upon reception of the light pulse of the light emission start signal, so as to prevent operation errors of the flash apparatus from occurring.

In the following, a light emitting system as the third embodiment of the present invention will be described. The light emitting system according to this embodiment includes a flash apparatus functioning as a transmitter, a flash apparatus functioning as a first receiver and a flash apparatus functioning as a second receiver.

The structure of the transmitter in the light emitting system according to this embodiment is the same as that of the transmitter shown in FIG. 1A. The structure of the second receiver is the same as that of the receiver shown in FIG. 1B.

Firstly, the structure of the first receiver in this embodiment will be described with reference to FIG. 2.

Figure 2:
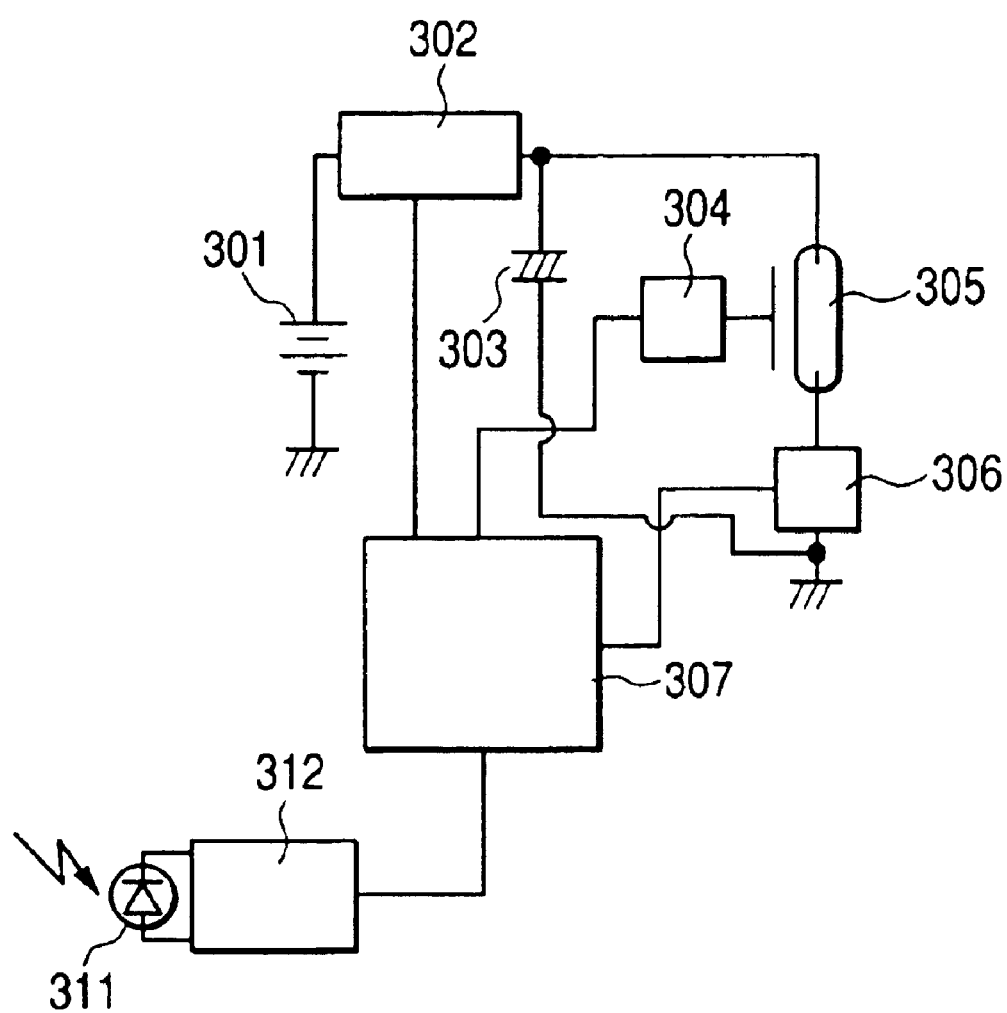
FIG. 2 is a block diagram showing the structure of a first receiver in the third embodiment of the present invention.

In FIG. 2, reference numeral 301 designates a battery serving as a power source, reference numeral 302 designates a boosting circuit for raising the voltage of the battery 301 by several hundreds volts, and reference numeral 303 designates a main condenser for storing the electric energy boosted by the boosting circuit 302.

Reference numeral 304 designates a trigger circuit that applies a voltage as high as several kilovolts to a discharge tube 305 to cause it to emit light. The discharge tube 305 emits light by converting the electric energy stored in the main condenser 303 into light energy. Reference numeral 306 designates a light emission control circuit, which is switched between a conductible state (or on-state) and a non-conductible state (or off-state) to control the light emission of the discharge tube 305.

Reference numeral 307 designates a microcomputer that controls operations of the flash apparatus functioning as the first receiver. (This microcomputer will be referred to as a microcomputer of the first receiver hereinafter.) Reference numeral 311 designates a light receiving sensor for receiving light emitted from the discharge tube 105 of the transmitter. Reference numeral 312 designates an existing light receiving part for converting a light signal received by the light receiving sensor 311 to an electric signal. The electric signal obtained by that conversion in the light receiving part 312 is output to the microcomputer 307 of the first receiver.

In the flash apparatus functioning as the first receiver as described above, when a power switch (not shown) provided on this flash apparatus is turned on, the microcomputer 307 of the first receiver starts its operation and causes the boosting circuit 302 to start to operate. Electric energy boosted by the boosting circuit 302 is stored in the condenser 303. The charging of the condenser 303 with the electric energy is continued until a voltage that enables the light emission of the discharge tube 305 is attained. In connection with the above-described apparatus, while the first receiver according to this embodiment is composed as a unit including a light emitting part (including the discharge tube 305 or the like) and a receiving part (including the light receiving sensor 311 and the light receiving part 312), the light emitting part and the receiving part may be constructed as separate units that are adapted to be connected to each other.

In the following, a description will be made of an operation of the transmitter on the occasion of photographing (wireless photographing) with the light emission from the first and second receivers.

Firstly, a description will be made, with reference to the flow chart shown in FIGS. 16A and 16B, of a communicating operation between the camera body 120 and the microcomputer 107 of the transmitter and an operation of the transmitter in response to that communicating operation.

When a clock signal of one byte length is input to the terminal S0 in the communication terminals 108 between the camera body and the microcomputer 107 of the transmitter (at time T0 in FIG. 5), an interrupt occurs in the microcomputer 107 of the transmitter (step S3001).

In step S3002, the microcomputer of the transmitter determines whether or not the command communicated from the camera body 120 is a light emission preparation signal transmission command to the receivers (i.e. first and second receivers). When it is determined that the transmitted command is the light emission preparation signal transmission command, the process proceeds to step S3005, while when it is determined that the command is not the light emission preparation signal transmission command, the process proceeds to step S3003.

In step S3003, communication processes other than the communication process for light emission preparation signal transmission command are performed, and the process proceeds to step S3004. In step S3005, information (i.e. light emission data) on the channel (CH) of the wireless communication, light emission groups, one shot emission, and multi shot emission set in the transmitter or in the camera body 120 is set in the radio wave transmitting part 110 and a memory circuit provided in the microcomputer 107 of the transmitter in accordance with the format indicated in the Tables 1 through 4.

In step S3006, the radio wave transmitting part 110 is caused to start to transmit the light emission data set in step S3005 from the antenna 109 by radio wave, and then the process proceeds to step S3007. For example, in the case in which the set light emission data designates channel 1 (CH1), whole group light emission, one shot light emission, and "light emission amount"="full emission minus 1", the data in which the first-byte=10011100 and the second-byte= 10000100 is transmitted in accordance with Table 1 and Table 2. In this case, the waveform transmitted from the radio wave transmitting part is as waveform (D) shown in FIG. 5.

In step S3007, a light communication interval timer, which controls the interval of light pulses for light communication (or optical communication) by the discharge tube 105, is started. In step S3008 it is determined whether or not bit 7 (i.e. D7 in Table 1)=1, and if it is determined D7=1, the process proceeds to step S3014. Otherwise, the process proceeds to step S3009.

In step S3014, a subroutine of light emission process for one pulse is executed, and the process proceeds to step S3015. In step S3015, the bit count is incremented by 1, and the process proceeds to step S3009. In step S3009, it is determined whether the count of the light communication interval timer reaches the timing for allowing the transmission of the next light pulse. If in the affirmative in step S3009, the process proceeds to step S3010, while if in the negative, the process repeats step S3009.

In step S3010, the light communication interval timer is restarted. In step S3011, it is determined whether or not the bit of the next light emission data is 1. If it is determined that this bit is 1, the process proceeds to step S3016, while if it is determined that the bit is not 1, the process proceeds to step S3012. For example, if the bit of the latest light emission data is bit 7 (i.e. D7 in Table 1), the bit of the next light emission data will be bit 6 (i.e. D6 in Table 1).

In step S3016, the subroutine of light emission process is executed, and the process proceeds to step S3012. In step S3012, it is determined whether or not one byte of the light communication has been completed, based on the bit count. When it is determined that one byte of the data communication has been completed, the process proceeds to step S3013, while when it is determined that one byte of the data communication has not been completed, the process proceeds to step S3017. In step S3017, the bit count is incremented by 1, and the process returns to step S3009.

In step S3013, it is determined whether or not the number of bytes to be transmitted has been completed. If it is determined that the bytes to be transmitted have been completed, the process proceeds to step S3004, while if it is determined that the bytes to be transmitted have not been completed, the process proceeds to step S3018. In step S3018, the byte count is incremented by 1, and the process proceeds to step S3019. In step S3019, the process waits a predetermined time corresponding to the interval between bytes and returns to step S3007. In step S3004, the communication interrupt is ended and the process returns to the main routine.

Figure 5:
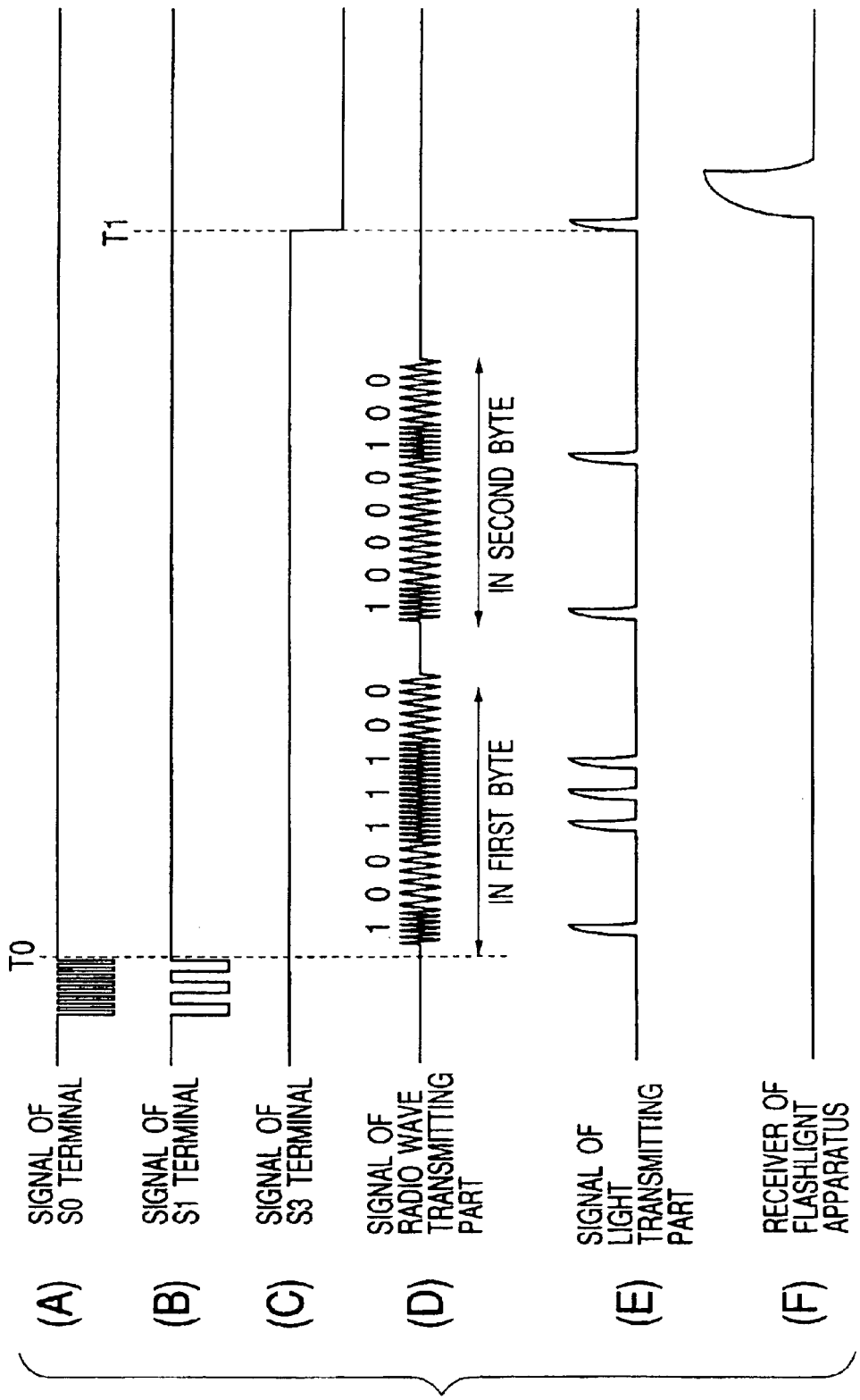
FIG. 5 is a chart showing waveforms at various parts of the transmitter and the receiver in the third embodiment of the present invention.

The waveform of the light communication transmitting the light emission data is shown as waveform (E) in FIG. 5. The content of the light emission data is the same as the light emission data transmitted through the radio wave communication (e.g. the first byte=10011100 and the second byte= 10000100).

Figure 8:
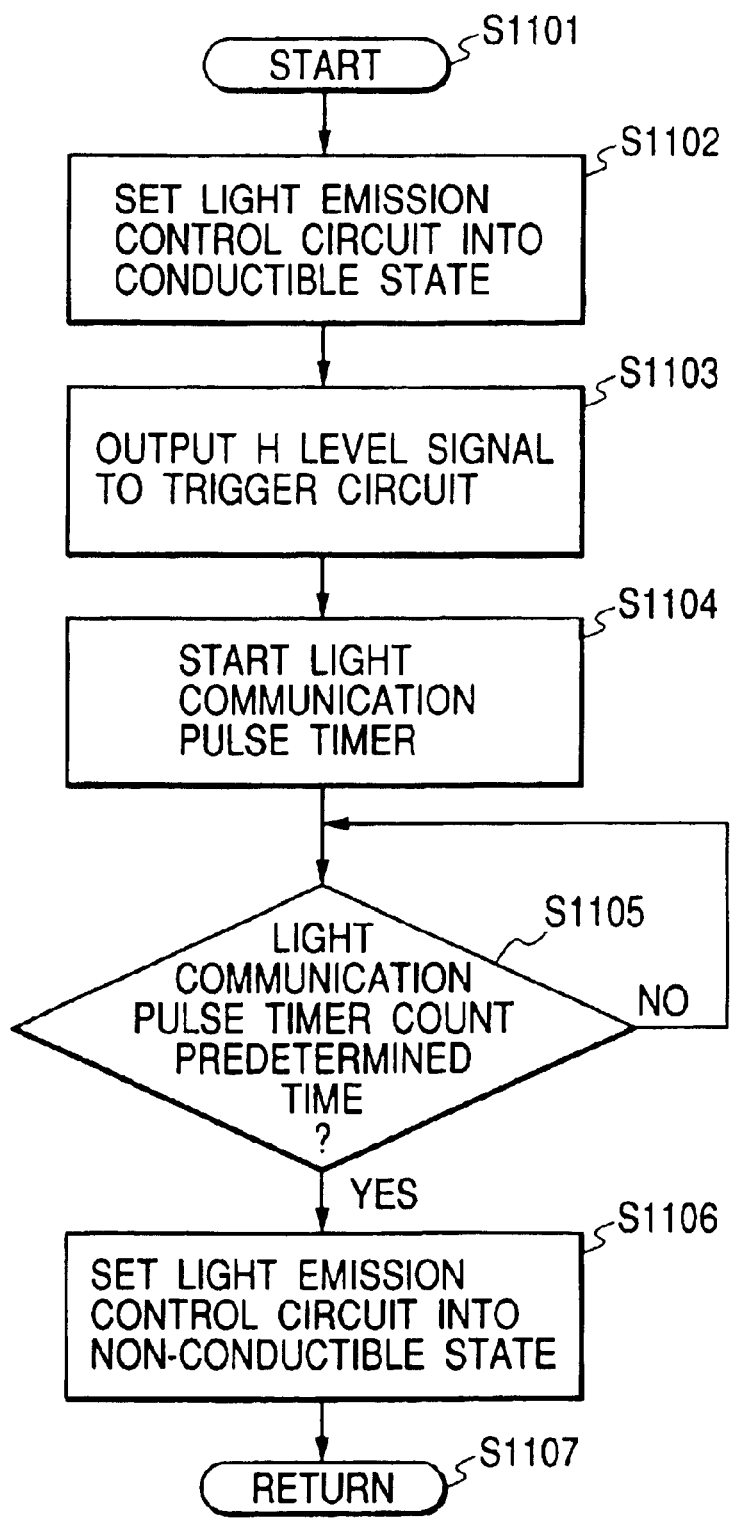
FIG. 8 is a flow chart showing an operation of the transmitter in the first embodiment of the present invention.

The operation performed by the subroutine of one pulse light emission process called in steps S3014 and S3016 is the same as the operation shown in the flow chart of FIG. 8. In connection with this, in this embodiment, the light emission operation is started by calling the subroutine instead of by the interrupt process as described in connection with the first embodiment.

While in waveforms (D) and (E) shown in FIG. 5, the radio wave signal (light emission data) from the antenna 109 (or radio wave transmitting part 110) and the light signal (light emission data) from the discharge tube 105 is substantially in synchronization with each other, they are not necessarily required to synchronize with each other.

On the other hand, the operation of the transmitter upon transmitting light emission start signal is the same as the operation shown in the flow chart of FIG. 8. Therefore, the light emission start signal is transmitted to the first receiver and the second receiver by the light emission of the discharge tube 105 at time T1 in FIG. 5. In connection with this, the waveform of the light emission of the discharge tube 105 upon transmitting the light emission start signal is show as waveform (E) in FIG. 5.

In the following, operations of the first receiver and the second receiver will be described.

Figure 17B:
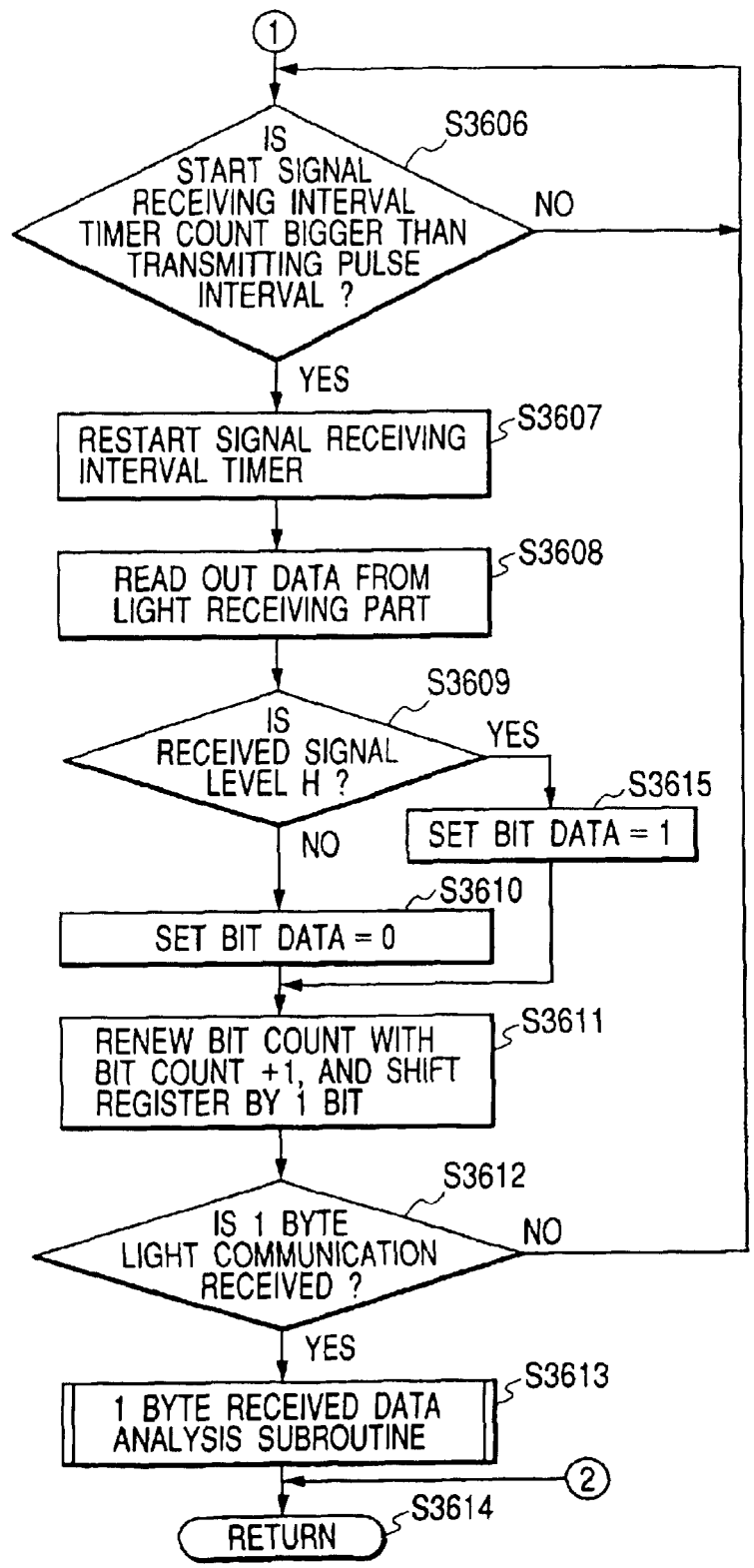
FIG. 17 is comprised of FIGS. 17A and 17B showing a flow chart of an operation of a communication process of the first receiver in the third embodiment of the present invention.

Firstly, a description will be made, with reference to the flow chart shown in FIGS. 17A and 17B, of the operation of the first receiver, that is specifically, the operation of the first receiver on the occasion of receiving a light emission preparation signal and a light emission start signal by light communication by the discharge tube 105 of the transmitter.

When the light receiving sensor 311 (or light receiving part 312) of the first receiver receives the light communication pulse of the discharge tube 105 of the transmitter, a interrupt process is started in the microcomputer. 307 of the first receiver (in step S3601).

In step S3602, it is determined whether or not the light emission start signal wait flag FLG is 1. If it is determined that the flag FLG is 1, the process proceeds to step S3620, while if it is determined that the flag FLG is not 1, the process proceeds to step S3603. In step S3620, the receiver light emission process subroutine shown in the flow chart of FIG. 12 is executed. With the execution of this subroutine, the light emission process of the one shot light emission or the first light emission process in the multi shot light emission is completed. After that, the process proceeds to step S3621.

In step S3621, the light emission start signal wait flag FLG is set to 0, and the process proceeds to step S3622. In step S3622, it is determined whether or not the light emission mode set by the communication with the transmitter is the multi shot light emission mode. If it is determined that the set light emission mode is the multi shot emission mode, the process proceeds to step S3623, while if it is determined that the set mode is not the multi shot emission mode, the process proceeds to step S3614.

In step S3623, it is determined whether the number of times of emission in the multi shot light emission set by the communication is one. If the number of times of emission is one, the process proceeds to step S3614, while if the number of times of emission is not one, the process proceeds to step S3624. In step S3624, count of the number of times of multi shot light emission is set to 1, and the process proceeds to step S3625.

In step S3625, a multi shot emission interval timer, which generates timer interrupts at a light emission interval corresponding to the frequency of the multi shot light emission set by the communication with the transmitter, is started, and the process proceeds to step S3614.

On the other hand, in step S3603, bit data D7 in a buffer register for the received data is set to 1. In step S3604, the buffer register for the received data is shifted to the left by 1 bit (see Table 1). For example, the bit data in D7 is shifted to D0 and the bit data in D6 is shifted to D7.

In step S3605, a reception interval timer for controlling the interval of reception of the light pulses is started. In step S3606, when the count of the reception interval timer exceeds the interval of the transmission pulses, the process proceeds to step S3607. In step S3607, the receiving interval timer is restarted in preparation for the reception of the next pulse.

In step S3608, an input from the light receiving part 312 is read in. In step S3609, if the input from the light receiving part 312 is at an H level (which indicates that light has received), the process proceeds to step S3615, while the input is not at the H level, the process proceeds to step S3610. In step S3615, a bit data in the buffer register of the received data is set to 1, and the process proceeds to step S3611. In step S3610, a bit data in the buffer register of the received data is set to 0, and the process proceeds to step S3611. For example, if D7 in the buffer register of the receiving data has been shifted to D0 in step S3604, this bit data D0 is set to 1 or 0.

In step S3611, the bit count is incremented by 1, and the buffer register for the received data is shifted in the left by 1 bit. In step S3612, it is determined whether or not one byte of light communication data has been received, based on the bit count. If it is determined that one byte of the data has been received, the process proceeds to step S3613, while if it is determined that one byte of data has not been received, the process returns to step S3606.

In step S3613, a subroutine for analyzing the one byte of received data is executed. This received data analysis subroutine performs analysis of the received data in terms of the data length, in which byte the next data is, the light emission mode, the light emission amount, the light emission start signal wait flag FLG, and, in the case of the multi shot light emission, the number of times and frequency of the light emission as well as data setting. In connection with this, it should be noted that while in the first embodiment, the interrupt process is concerning to the case in which one byte of data has received through radio wave communication, in this embodiment the subroutine is concerning to the case in which one byte of data has received through light communication.

In step S3613, after the execution of the subroutine for analyzing the one byte of received data, the process proceeds to S3614 and the interrupt process is ended.

In the following, the operation of the receiver light emission process subroutine called in step S3620 mentioned above will be described with reference to the flow chart of FIG. 12.

This process starts in step S1501. In step S1502, the microcomputer 307 of the first receiver outputs an H level signal to the light emission control circuit 306 to turn the light emission control circuit 306 into the conductible state, with which a discharge loop composed of the anode of the main condenser 303—the discharge tube 305—the light emission control circuit 306—the cathode of the main condenser 303 is formed.

In step S1503, the microcomputer 307 of the first receiver outputs an H level signal to the trigger circuit 304 for a predetermined time. In response to this, the trigger circuit 304 applies a high voltage to the discharge tube 305, and the discharge tube 305 starts to emit light.

In step S1504, a light emission amount timer for measuring a time period during which the light emission control circuit 306 is in the on-state (i.e. in the conductible state) corresponding to a prescribed light amount obtained by the above-mentioned communication with the transmitter is started.

In step S1505, it is determined whether the light emission amount timer has counted a predetermined time that gives the prescribed light amount, and when the predetermined time has elapsed, the process proceeds to step S1506. In step S1506, the microcomputer 307 of the first receiver outputs an L level signal to the light emission control circuit 306 to turn the light emission control circuit 306 into the nonconductible state, with which the discharge loop composed of the anode of the main condenser 303—the discharge tube 305—the light emission control circuit 306—the cathode of the main condenser 303 is shut off, and the discharge tube 305 stops the light emission.

In step S1507, the light emission start signal wait flag FLG is set to 0 in order for the receiver to be prevented from emitting light erroneously after the light emission, and the subroutine is ended. In connection with the above-described process, the waveform of the light emission by the first receiver (i.e. the first slave flash apparatus) in the receiver light emission process subroutine and its light emission timing will be seen in waveform (F) in FIG. 5. The above-described light emitting operation is the operation in the case of the one shot light emission or the operation in the case of the first emission in the multi shot light emission. The light emitting operation in the second and subsequent emission is started as an interrupt after the multi light emission interval timer is started in step S3625 in the flow chart of FIGS. 17A and 17B, and the operation is the same as the process shown in the flow chart of FIG. 11.

Next, a description will be made of the operation in the second receiver. The operation in the second receiver is the same as the operation in the receiver of the first embodiment. In other words, the second receiver receives a light emission preparation signal through radio wave communication with the transmitter to perform a light emission preparation operation and receives a light emission start signal through light communication with the transmitter to perform a light emission operation.

In the following, a light emitting system as another embodiment of the present invention will be described. The light emitting system according to this embodiment includes a transmitter, a first receiver and a second receiver. The structure of the transmitter is the same as the structure of the transmitter shown in FIG. 1A and the structure of the second receiver is the same as the structure of the receiver shown in FIG. 1B. The structure of the first receiver in this embodiment is the same as the structure of the receiver shown in FIG. 2.

Figure 16:
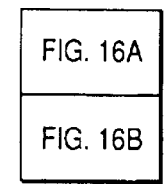
FIG. 16 is comprised of FIGS. 16A and 16B showing a flow chart of an operation of a communication process of the transmitter and a camera in the third embodiment of the present invention.
Figure 16A:
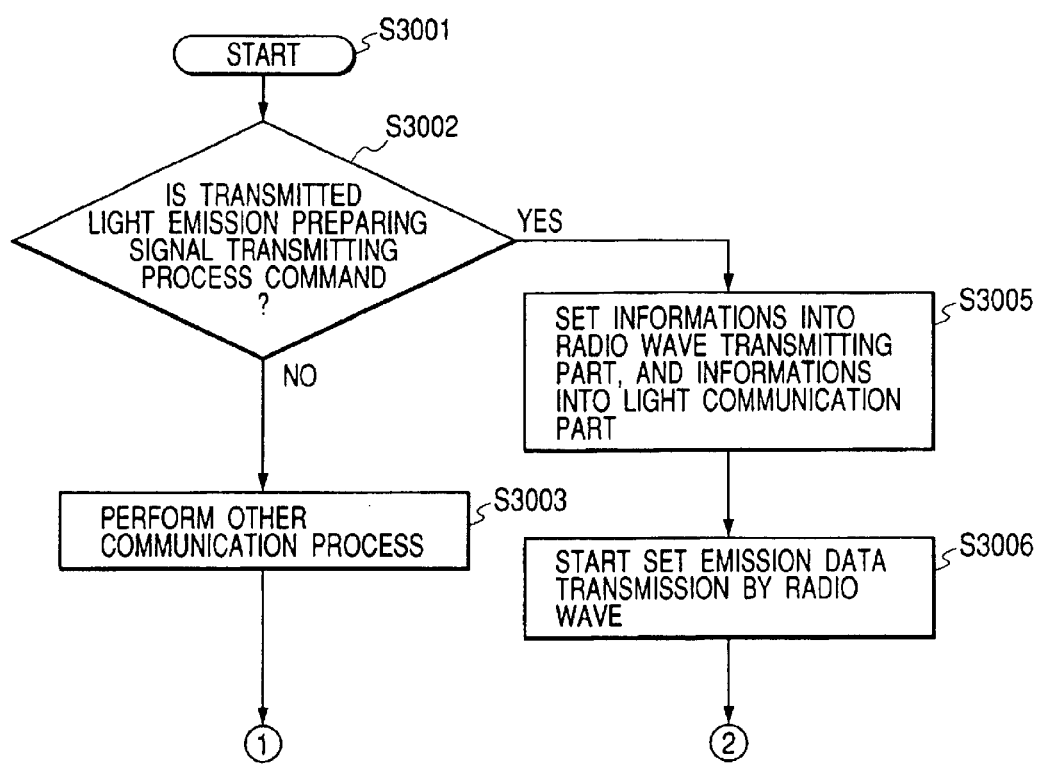
Figure 16B:
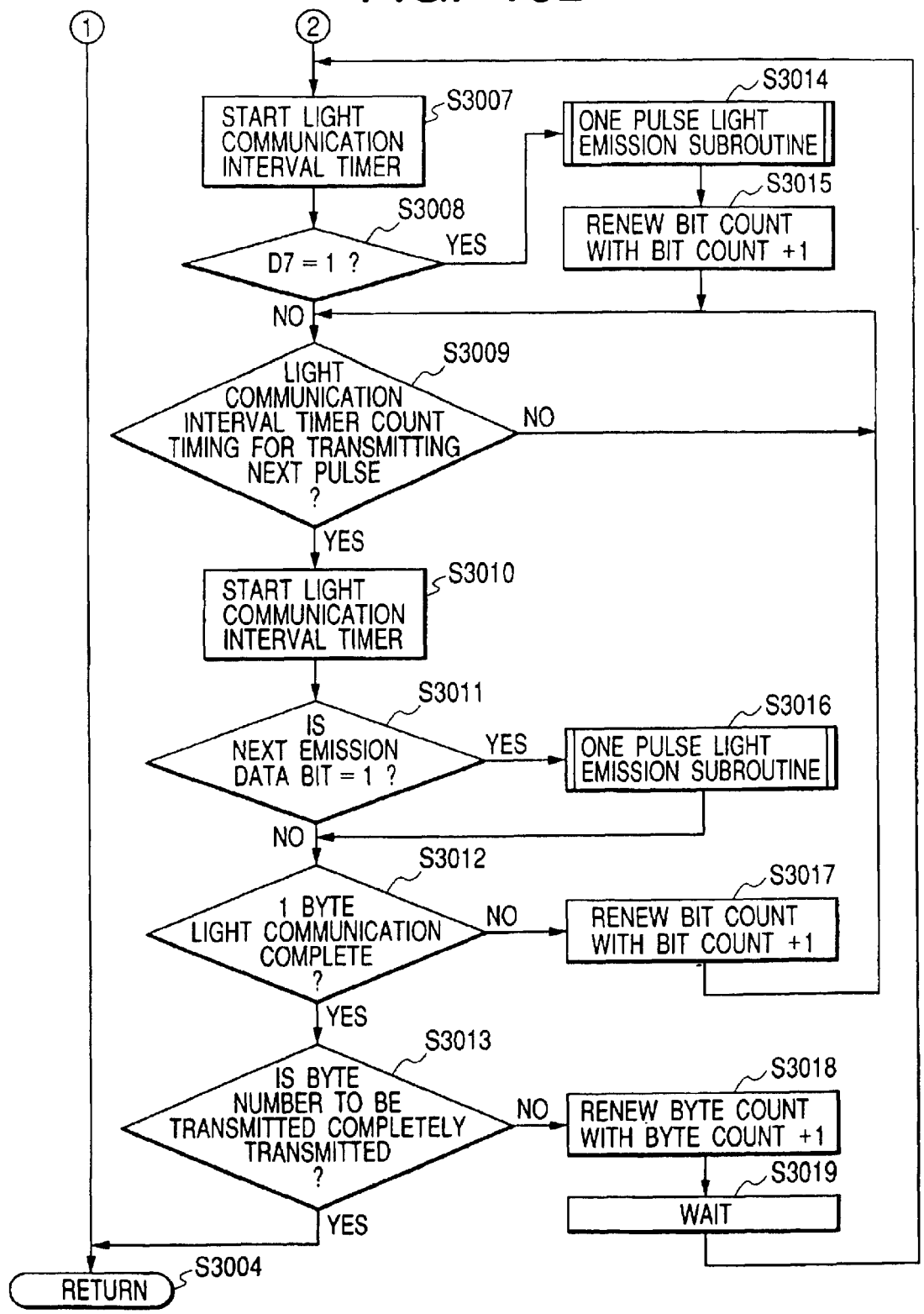

The operation of the transmitter upon transmitting a light emission preparation signal (i.e. the interrupt process for transmitting the light emission preparation signal that is generated when a light emission preparation signal transmission command is input to the microcomputer 107 of the transmitter through a communication from the camera body 120 (at time T0 in FIG. 6)) is the same as the process shown in the flow chart of FIGS. 16A and 16B.

The interrupt process in the microcomputer 107 of the transmitter that is generated when a light emission start signal is input from the camera body 120 by changing the level of the terminal S3 of the microcomputer 107 of the transmitter from H level to L level is the same as the process shown in the flow chart of FIG. 13.

As per the above, in this embodiment, the transmitter transmits the light emission preparation signals to the first receiver and the second receiver through light communication and radio wave communication, and transmits the light emission start signals to the first receiver and the second receiver through light communication and radio wave communication respectively.

In the following, a description will be made of operations of the first receiver and the second receiver. Firstly, the operation of the first receiver is the same as the operation of the first receiver in the third embodiment (shown in FIGS. 17A and 17B). Therefore, the first receiver receives the light emission preparation signal and the light emission start signal through the light communication with the transmitter (or the discharge tube 105) to perform prescribed operations. In connection with this, the waveform of the light emission of the first receiver (or the discharge tube 305) upon receiving the light emission start signal from the transmitter and its emission timing will be seen in waveform (F) in FIG. 6.

On the other hand, the operation of the second receiver is the same as the operation of the receiver is the second embodiment (shown in FIGS. 14A and 14B). The second receiver performs a light emission preparation operation upon receiving the light emission preparation signal (through the radio wave communication) from the antenna 109 (or the radio wave transmitting part 110) of the transmitter. Furthermore, the second receiver start the light emitting operation upon receiving the light emission start signal (through the radio wave communication) from the antenna 109 (or the radio wave transmitting part 110) of the transmitter or the light emission start signal (through the light communication) from the discharge tube 105 of the transmitter.

Figure 6:
FIG. 6 is a chart showing waveforms at various parts of the transmitter and the receiver in the fourth embodiment of the present invention.

In connection with this, the waveform of the light emission of the second receiver upon receiving the light emission start signal through the light communication is shown as waveform (F) in FIG. 6, while the waveform of the light emission of the second receiver upon receiving the light emission start signal through the radio wave communication is shown as waveform (F') in FIG. 6.

While in the first through fourth embodiments as described in the forgoing, the transmitter transmits the light emission start signal or the light emission data by radio wave, the transmitter may be adapted to transmit the light emission start signal or the light emission data by sonic wave (including ultrasonic wave). In other words, it is possible to communicate the light emission start signal or the light emission data through sound that is modulated with an analog modulation scheme or a digital modulation scheme.

What is claimed is:

1. A light emitting system comprising:
    a transmitting apparatus having a first transmitting circuit that transmits a light emission data signal for setting a light emission condition by a signal other than light on a wireless basis and a second transmitting circuit that transmits a light emission start signal for starting light emission by light on a wireless basis; and
    a receiving apparatus either adapted to be connected to an illuminating apparatus that emits illuminating light or having such an illuminating apparatus, said receiving apparatus having a first receiving circuit that receives said light emission data signal by the signal other than light on a wireless basis, a second receiving circuit that receives said light emission start signal by light on a wireless basis, and a control circuit that performs a light emission preparation operation of said illuminating apparatus based on an output of said first receiving circuit that has received said light emission data signal and causes said illuminating apparatus to emit light based on an output of said second receiving circuit that has received said light emission start signal.

2. A transmitting apparatus for use in a light emitting system provided with a receiving apparatus either adapted to be connected to an illuminating apparatus that emits illuminating light or having such an illuminating apparatus, said receiving apparatus having a first receiving circuit that receives a light emission data signal for setting a light emission condition by a signal other than light on a wireless basis, a second receiving circuit that receives a light emission start signal for starting light emission by light on a wireless basis, and a control circuit that performs a light emission preparation operation of said illuminating apparatus based on an output of said first receiving circuit that has received said light emission data signal and causes said illuminating apparatus to emit light based on an output of said second receiving circuit that has received said light emission start signal, the transmitting apparatus comprising:
    a first transmitting circuit that transmits said light emission data signal by the signal other than light on a wireless basis; and a second transmitting circuit that transmits said light emission start signal by light on a wireless basis.

3. A receiving apparatus for use in a light emitting system provided with a transmitting apparatus having a first transmitting circuit that transmits a light emission data signal for setting a light emission condition by a signal other than light on a wireless basis and a second transmitting circuit that transmits a light emission start signal for starting light emission by light on a wireless basis, the receiving apparatus comprising:

at least one of an illuminating apparatus that emits illuminating light and a circuit adapted to be connected to an illuminating apparatus that emits illuminating light;

a first receiving circuit that receives said light emission data signal by the signal other than light on a wireless basis;

a second receiving circuit that receives said light emission start signal by light on a wireless basis; and a control circuit that performs a light emission preparation operation of said illuminating apparatus based on an output of said first receiving circuit that has received said light emission data signal and causes said illuminating apparatus to emit light based on an output of said second receiving circuit that has received said light emission start signal.

4. A light emitting system according to claim 1, wherein said first transmitting circuit of said transmitting apparatus is capable of transmitting said light emission start signal by the signal other than light on a wireless basis, and said first receiving circuit of said receiving apparatus is capable of receiving said light emission start signal by the signal other than light on a wireless basis, and wherein when said second receiving circuit cannot receive said light emission start signal by light, said control circuit causes said illuminating apparatus to emit light based on output of said first receiving circuit that has received said light emission start signal by the signal other than light.

5. A transmitting apparatus according to claim 2, wherein said first receiving circuit of said receiving apparatus is capable of receiving said light emission start signal by the signal other than light on a wireless basis, and when said second receiving circuit cannot receive said light emission start signal by light, said control circuit causes said illuminating apparatus to emit light based on output of said first receiving circuit that has received said light emission start signal by the signal other than light, and wherein said first transmitting circuit of said transmitting apparatus is capable of transmitting said light emission start signal by the signal other than light on a wireless basis.

6. A receiving apparatus according to claim 3, wherein said first transmitting circuit of said transmitting apparatus is capable of transmitting said light emission start signal by the signal other than light on a wireless basis, and said first receiving circuit of said receiving apparatus is capable of receiving said light emission start signal by the signal other than light on a wireless basis, and wherein when said second receiving circuit cannot receive said light emission start signal by light, said control circuit causes said illuminating apparatus to emit light based on output of said first receiving circuit that has received said light emission start signal by the signal other than light.

7. A light emitting system comprising:

a transmitting apparatus having a first transmitting circuit that transmits a light emission data signal for setting a light emission condition by a signal other than light on a wireless basis and a second transmitting circuit that transmits said light emission data signal and a light emission start signal for starting light emission by light on a wireless basis; and a first receiving apparatus either adapted to be connected to a first illuminating apparatus that emits illuminating light or having such a first illuminating apparatus, said first receiving apparatus having a receiving circuit that receives said light emission data signal and said light emission start signal by light on a wireless basis, and a control circuit that controls a light emission preparation operation and light emission of said first illuminating apparatus based on an output of said receiving circuit that has received said light emission data signal and said light emission start signal; and a second receiving apparatus either adapted to be connected to a second illuminating apparatus that emits illuminating light or having such a second illuminating apparatus, said second receiving apparatus having a first receiving circuit that receives said light emission data signal by the signal other than light on a wireless basis, a second receiving circuit that receives said light emission start signal by light on a wireless basis, and a control circuit that performs a light emission preparation operation of said illuminating apparatus based on an output of said first receiving circuit that has received said light emission data signal and causes said second illuminating apparatus to emit light based on an output of said second receiving circuit that has received said light emission start signal.

8. A transmitting apparatus for use in an light emitting system provided with a first receiving apparatus either adapted to be connected to a first illuminating apparatus that emits illuminating light or having such a first illuminating apparatus, said first receiving apparatus having a receiving circuit that receives a light emission data signal and a light emission start signal by light on a wireless basis, and a control circuit that controls a light emission preparation operation and light emission of said first illuminating apparatus based on an output of said receiving circuit that has received said light emission data signal and said light emission start signal, and a second receiving apparatus either adapted to be connected to a second illuminating apparatus that emits illuminating light or having such a second illuminating apparatus, said second receiving apparatus having a first receiving circuit that receives the light emission data signal by a signal other than light on a wireless basis, a second receiving circuit that receives the light emission start signal by light on a wireless basis, and a control circuit that performs a light emission preparation operation of said illuminating apparatus based on an output of said first receiving circuit that has received said light emission data signal and causes said second illuminating apparatus to emit light based on an output of said second receiving circuit that has received said light emission start signal, the transmitting apparatus comprising:

a first transmitting circuit that transmits the light emission data signal for setting a light emission condition by the signal other than light on a wireless basis; and a second transmitting circuit that transmits the light emission data signal and the light emission start signal for starting light emission by light on a wireless basis.

9. A light emitting system according to claim 7, wherein said first transmitting circuit is capable of transmitting said light emission start signal by the signal other than light on a wireless basis, and said first receiving circuit of said second receiving apparatus is capable of receiving said light emission start signal by the signal other than light on a wireless basis, and wherein said control circuit of said second receiving apparatus causes said second illuminating apparatus to emit light based on an output of said second receiving circuit of said second receiving apparatus that has received said light emission start signal, and when said second receiving circuit cannot receive said light emission start signal, causes said second illuminating apparatus to emit light based on an output of said first receiving circuit that has received said light emission start signal.

10. A transmitting apparatus according to claim 8, wherein said first receiving circuit of said second receiving apparatus is capable of receiving said light emission start signal by the signal other than light on a wireless basis, and said control circuit of said second receiving apparatus is capable of causing said second illuminating apparatus to emit light based on an output of said second receiving circuit of said second receiving apparatus that has received said light emission start signal, and when said second receiving circuit cannot receive said light emission start signal, causing said second illuminating apparatus to emit light based on an output of said first receiving circuit that has received said light emission start signal, and wherein said first transmitting circuit transmits said light emission start signal by the signal other than light on a wireless basis.

11. A light emitting system according to claim 1, wherein said first transmitting circuit transmits said light emission data signal or said light emission start signal by radio wave, sonic wave or ultrasonic wave on a wireless basis.

12. A transmitting apparatus according to claim 2, wherein said first transmitting circuit transmits said light emission data signal or said light emission start signal by radio wave, sonic wave or ultrasonic wave on a wireless basis.

13. A light emitting system according to claim 7, wherein said first transmitting circuit transmits said light emission data signal or said light emission start signal by radio wave, sonic wave or ultrasonic wave on a wireless basis.

14. A transmitting apparatus according to claim 8, wherein said first transmitting circuit transmits said light emission data signal or said light emission start signal by radio wave, sonic wave or ultrasonic wave on a wireless basis.

15. A light emitting system according to claim 4, wherein when said second receiving circuit receives said light emission start signal by light, said control circuit does not perform control based on an output of said first receiving circuit that has received said light emission start signal by the signal other than light for a predetermined time.

16. A receiving apparatus according to claim 6, wherein when said second receiving circuit receives said light emission start signal by light, said control circuit does not perform control based on an output of said first receiving circuit that has received said light emission start signal by the signal other than light for a predetermined time.

17. A light emitting system comprising:

a transmitting apparatus that is capable of transmitting a light emission data signal for setting a light emission condition by a signal other than light on a wireless basis and capable of transmitting a light emission start signal for starting light emission by light on a wireless basis; and a receiving apparatus either adapted to be connected to an illuminating apparatus that emits illuminating light or having such an illuminating apparatus, said receiving apparatus being capable of receiving said light emission data signal by the signal other than light on a wireless basis, and capable of receiving said light emission start signal by light on a wireless basis, wherein said receiving apparatus performs a light emission preparation operation of said illuminating apparatus based on the received light emission data signal and then causes said illuminating apparatus to emit light based on the light emission start signal received thereafter.

18. A light emitting system comprising:

a transmitting apparatus that is capable of transmitting a light emission data signal for setting a light emission condition by a signal other than light on a wireless basis and capable of transmitting said light emission data signal and a light emission start signal for starting light emission by light on a wireless basis; and a first receiving apparatus either adapted to be connected to a first illuminating apparatus that emits illuminating light or having such a first illuminating apparatus, said first receiving apparatus being capable of receiving said light emission data signal and said light emission start signal by light on a wireless basis, wherein said first receiving apparatus performs a light emission preparation operation of said first illuminating apparatus based on the received light emission data signal and causes said illuminating apparatus to emit light based on the received light emission start signal; and a second receiving apparatus either adapted to be connected to a second illuminating apparatus that emits illuminating light or having such a second illuminating apparatus, said second receiving apparatus being capable of receiving said light emission data signal by the signal other than light on a wireless basis, and capable of receiving said light emission start signal by light on a wireless basis, wherein said receiving apparatus performs a light emission preparation operation of said second illuminating apparatus based on the received light emission data signal and causes said second illuminating apparatus to emit light based on the received light emission start signal.

* * * * *

UNITED STATES PATENT AND TRADEMARK OFFICE
CERTIFICATE OF CORRECTION

PATENT NO. : 6,831,420 B1
DATED : December 14, 2004
INVENTOR(S) : Kei Tohyama

It is certified that error appears in the above-identified patent and that said Letters Patent is hereby corrected as shown below:

Column 1,
Line 21, delete "the-shutter" and insert -- the shutter --.

Column 8,
Line 9, "converted-by" and insert -- converted by --.

Column 9,
Line 56, delete ELG is 1" and insert -- FLG is 1 --.

Column 14,
Line 15, delete "wavetorm" and insert -- waveform --.
Line 33, delete "part 230" and insert -- part 210 --.

Signed and Sealed this

Twenty-eighth Day of March, 2006

JON W. DUDAS
*Director of the United States Patent and Trademark Office*